April 20, 1943.  E. S. COOK ET AL  2,317,132
BRAKE SYSTEM
Filed Dec. 31, 1940   8 Sheets-Sheet 1

INVENTORS
EARLE S. COOK
DOUGLAS R. BORST
BY
ATTORNEY

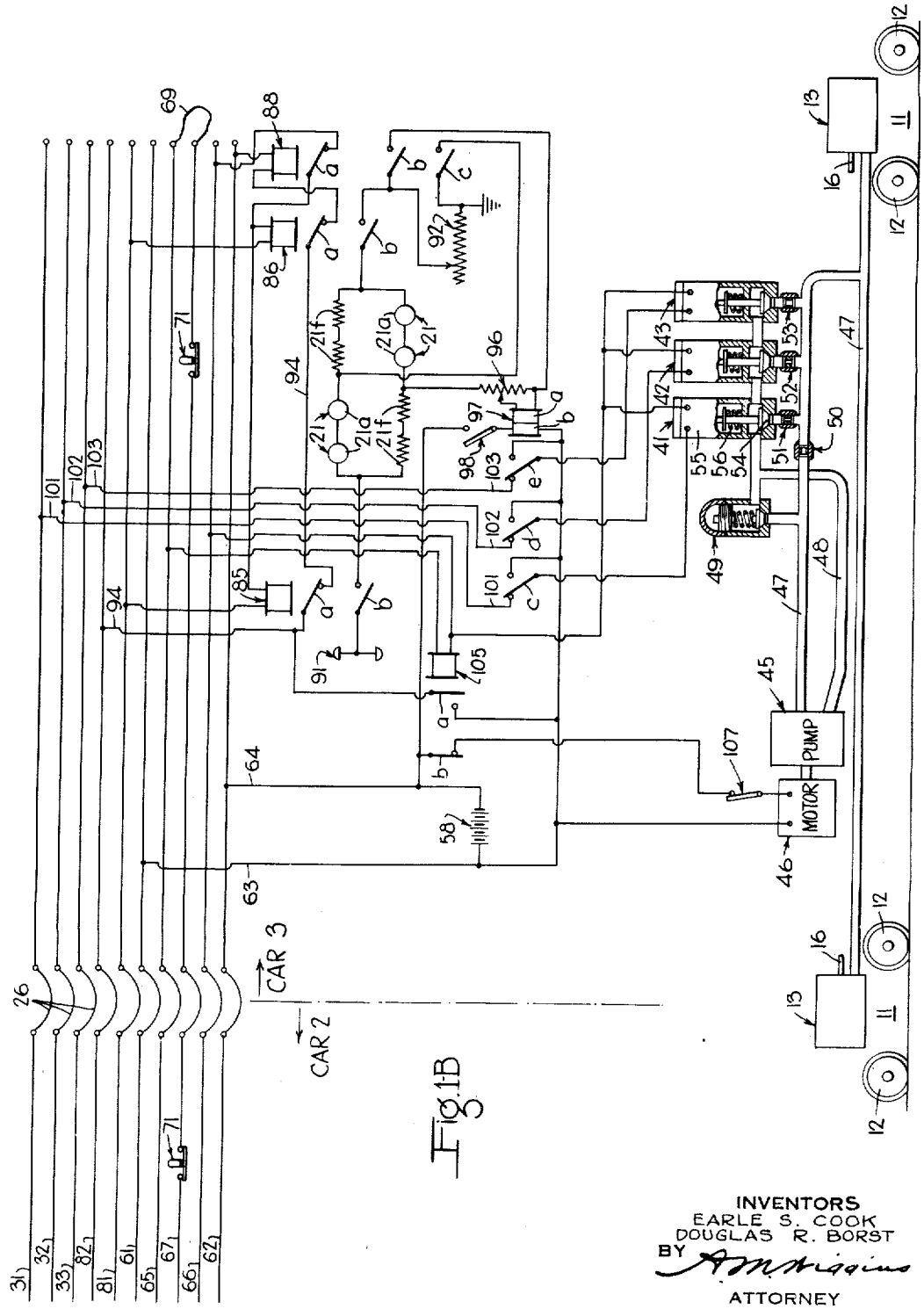

April 20, 1943.　　　E. S. COOK ET AL　　　2,317,132
BRAKE SYSTEM
Filed Dec. 31, 1940　　　8 Sheets-Sheet 3
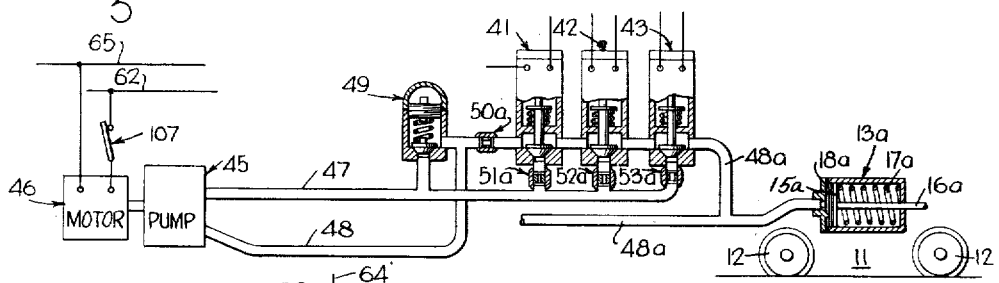
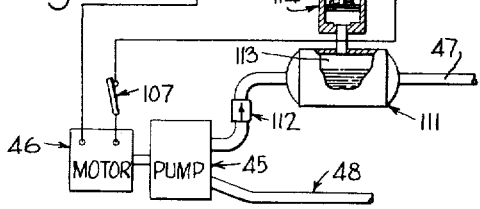
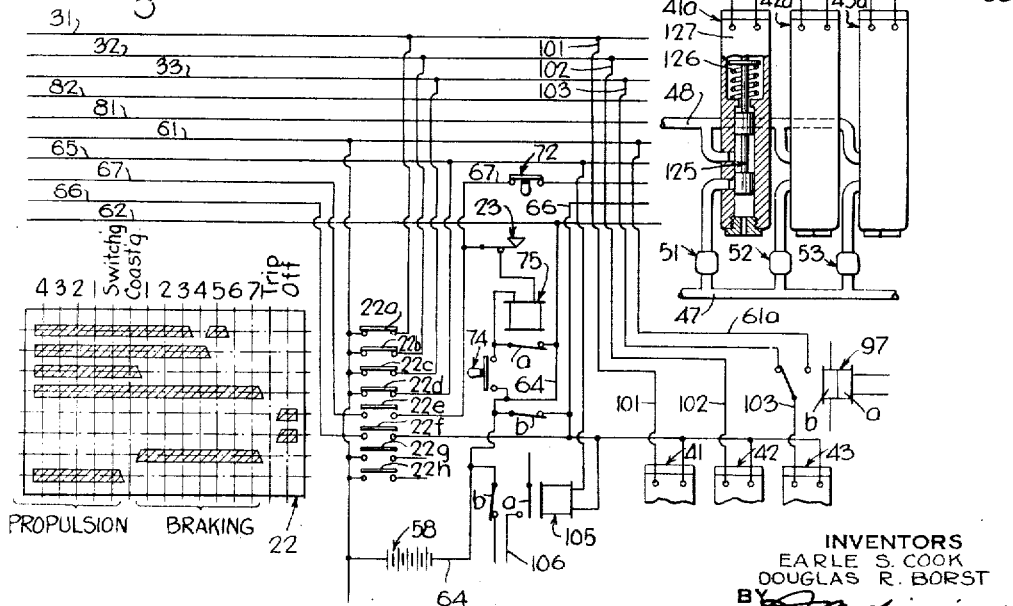
INVENTORS
EARLE S. COOK
DOUGLAS R. BORST
ATTORNEY

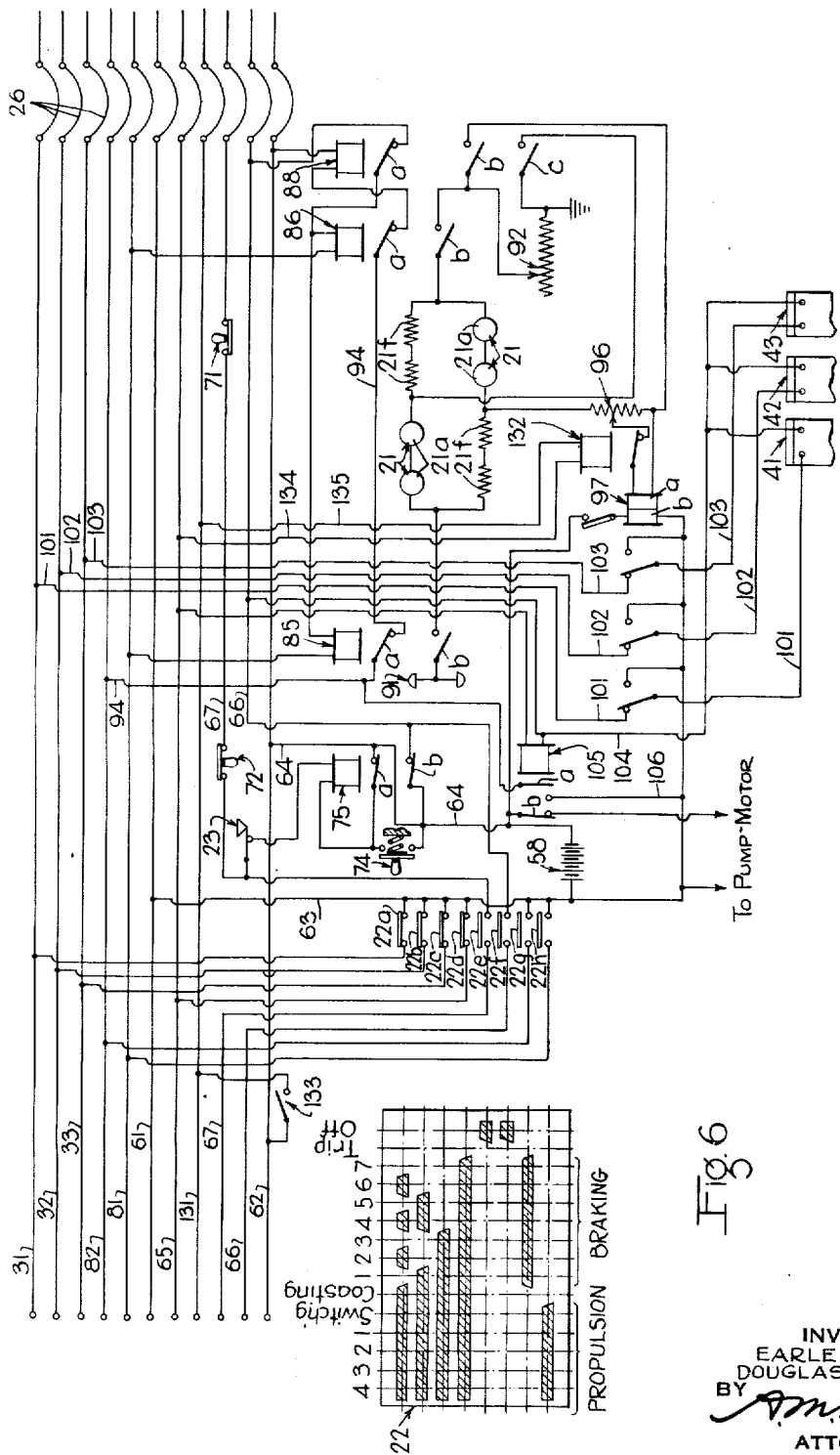

April 20, 1943.                E. S. COOK ET AL                 2,317,132
                                 BRAKE SYSTEM
                             Filed Dec. 31, 1940            8 Sheets-Sheet 7

INVENTORS
EARLE S. COOK
DOUGLAS R. BORST
BY
ATTORNEY

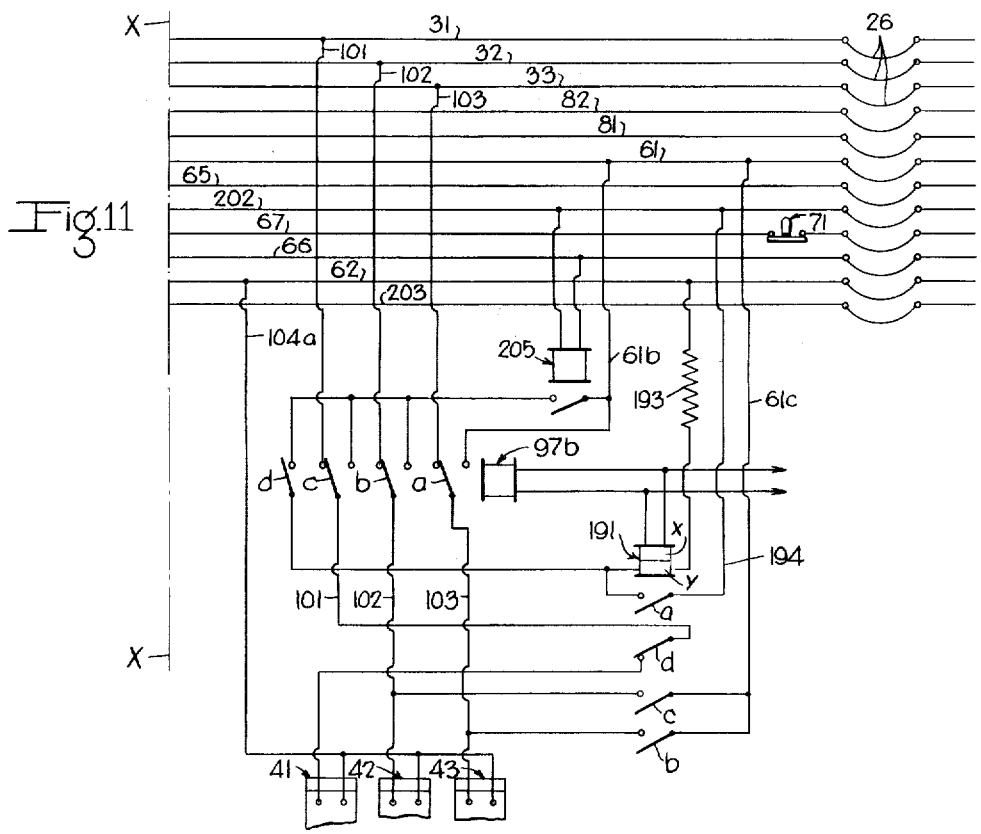

Patented Apr. 20, 1943

2,317,132

UNITED STATES PATENT OFFICE 2,317,132

BRAKE SYSTEM

Earle S. Cook, Wilkinsburg, and Douglas R. Borst, Pitcairn, Pa., assignors to The Westinghouse Air Brake Company, Wilmerding, Pa., a corporation of Pennsylvania Application December 31, 1940, Serial No. 372,592

57 Claims. (Cl. 303—3)

This invention relates to brake systems for vehicles, such as multiple-unit railway cars and train, and has particular relation to brake systems including dynamic brake apparatus and friction brake apparatus.

It is an object of our present invention to provide a novel arrangement for hydraulically controlling and varying the degree of application of friction brakes associated with a member to be braked, such as a vehicle wheel.

It is another object of our invention to provide a multiple-unit vehicle brake system having the hydraulically controlled brake equipment indicated in the foregoing object and further characterized by a self-contained circulatory hydraulic system on individual units.

It is another object of our invention to provide a multiple-unit vehicle brake system of the type indicated in the foregoing objects and further characterized by arrangements for controlling the pump in the hydraulic circulatory system of each of a plurality of individual vehicle units automatically or under the control of an operator stationed on one of the units.

It is another object of our invention to provide a vehicle brake system, including a hydraulically controlled friction brake of the type indicated in the foregoing objects and a dynamic brake, characterized by the fact that the friction brake is wholly suppressed under the control of the dynamic brake as long as the dynamic brake remains effective above a certain degree and is then applied to a degree called for by the operator.

It is another object of our invention to provide a vehicle brake system including a friction brake and a dynamic brake, characterized by the fact that the friction brake may be applied in varying degrees less than a certain fraction of its full or maximum application simultaneously with the dynamic brake as long as the dynamic brake remains effective above a certain degree, the friction brakes being automatically applied to a degree corresponding to that called for by the operator when the dynamic brake fades in effectiveness below the certain degree with reducing vehicle speed.

It is another object of our invention to provide a vehicle brake system, including a friction brake and a dynamic brake adapted to suppress the friction brake, characterized by an arrangement for rendering the dynamic brake effective or ineffective to suppress the friction brake depending upon the load carried by the vehicle.

It is another object of our invention to provide a vehicle brake system, including a friction brake and a dynamic brake, characterized by an arrangement for automatically distinguishing between fading of the dynamic brake in the normal manner with reducing vehicle speed and undesired failure thereof, by which arrangement the friction brake is wholly suppressed as long as the dynamic brake is effective above a certain degree and then applied to a predetermined relatively low degree when the dynamic brake fades in the normal manner and by which, if the dynamic brake fails at any time, the friction brake is instantly applied to a degree corresponding substantially to the degree of brake application called for by the operator.

It is another object of our invention to provide a vehicle brake system, including a friction brake and a dynamic brake adapted to suppress the friction brake as long as the dynamic brake is effective above a certain degree, characterized by an arrangement for causing the friction brake to be wholly suppressed or only partly suppressed under the control of the dynamic brake, depending upon the degree of application called for by the operator.

The above objects, and other objects of our invention which will be made apparent hereinafter, are attained by different embodiments of our invention subsequently to be described and shown in the accompanying drawings wherein Figs. 1A and 1B, taken together, constitute a diagrammatic view showing a multiple-unit vehicle brake system embodying our invention.

Fig. 2 is a fragmental diagrammatic view, indicating the manner which the spring-applied hydraulic pressure-released type of friction brake shown in Figs. 1A and 1B may be replaced by a hydraulic pressure-applied spring-released type of friction brake apparatus.

Fig. 3 is a fragmental diagrammatic view, indicating the manner in which either of the types of hydraulically controlled friction brake apparatus of Figs. 1A and 1B or Fig. 2 may be modified to provide an automatic control of the motor driving the pump in the hydraulic circulatory system in response to the fluid pressure in an accumulator or reservoir.

Fig. 4 is a fragmental diagrammatic view, showing a modified arrangement wherein the dynamic brake and the friction brake may be simultaneously applied and wherein the dynamic brake suppresses only partly the application of the friction brake.

Figure 1A:
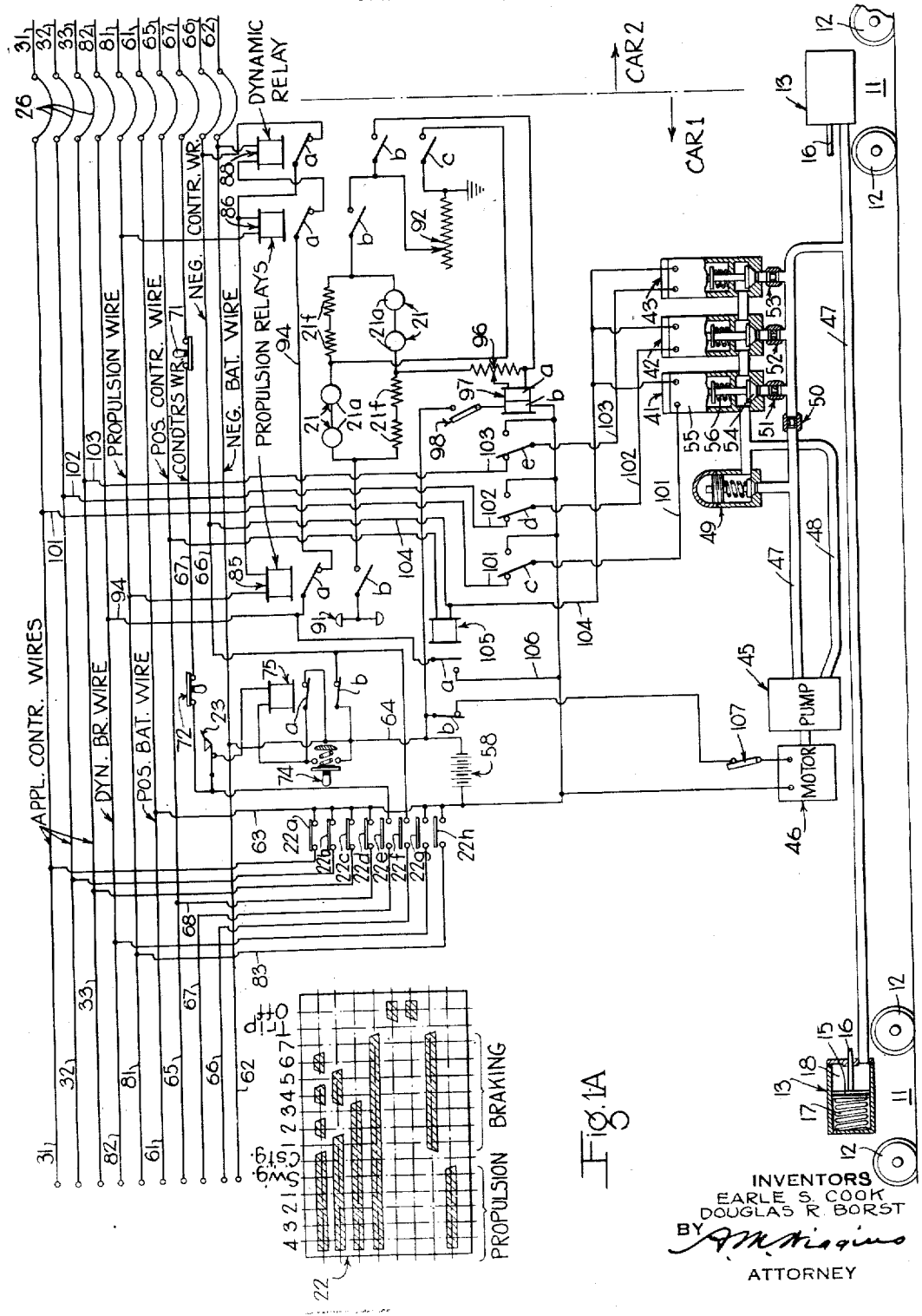
Figure 7:
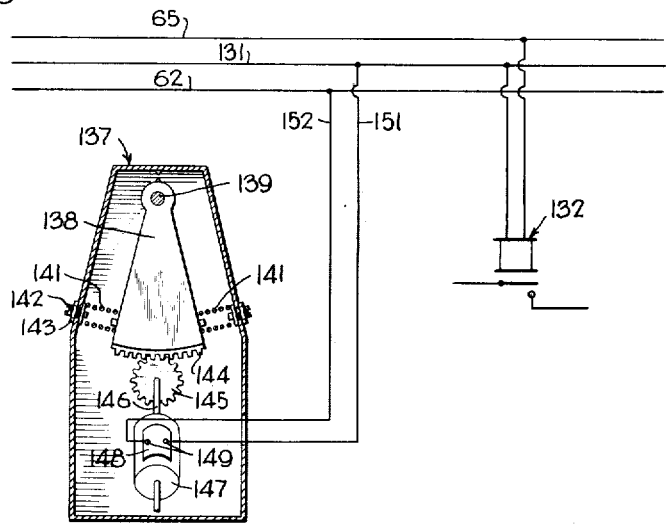
Figure 8:
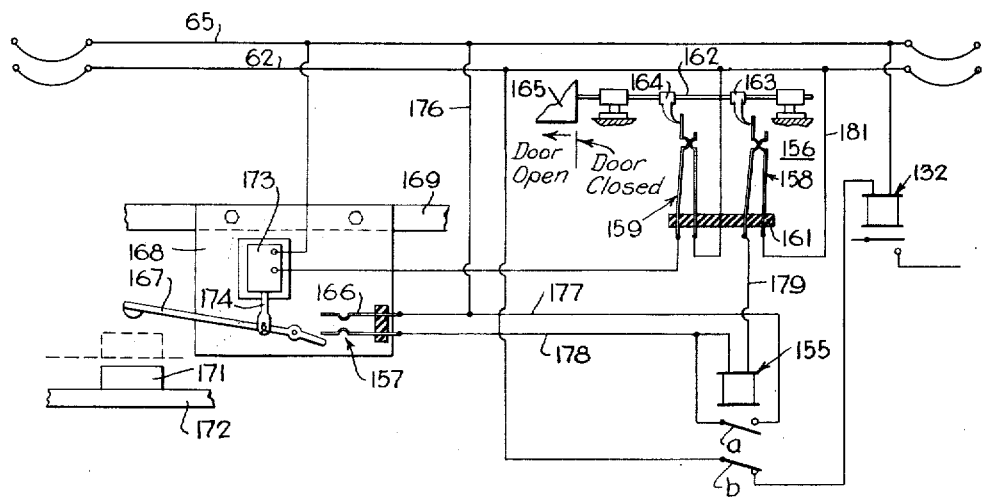
Figure 9:
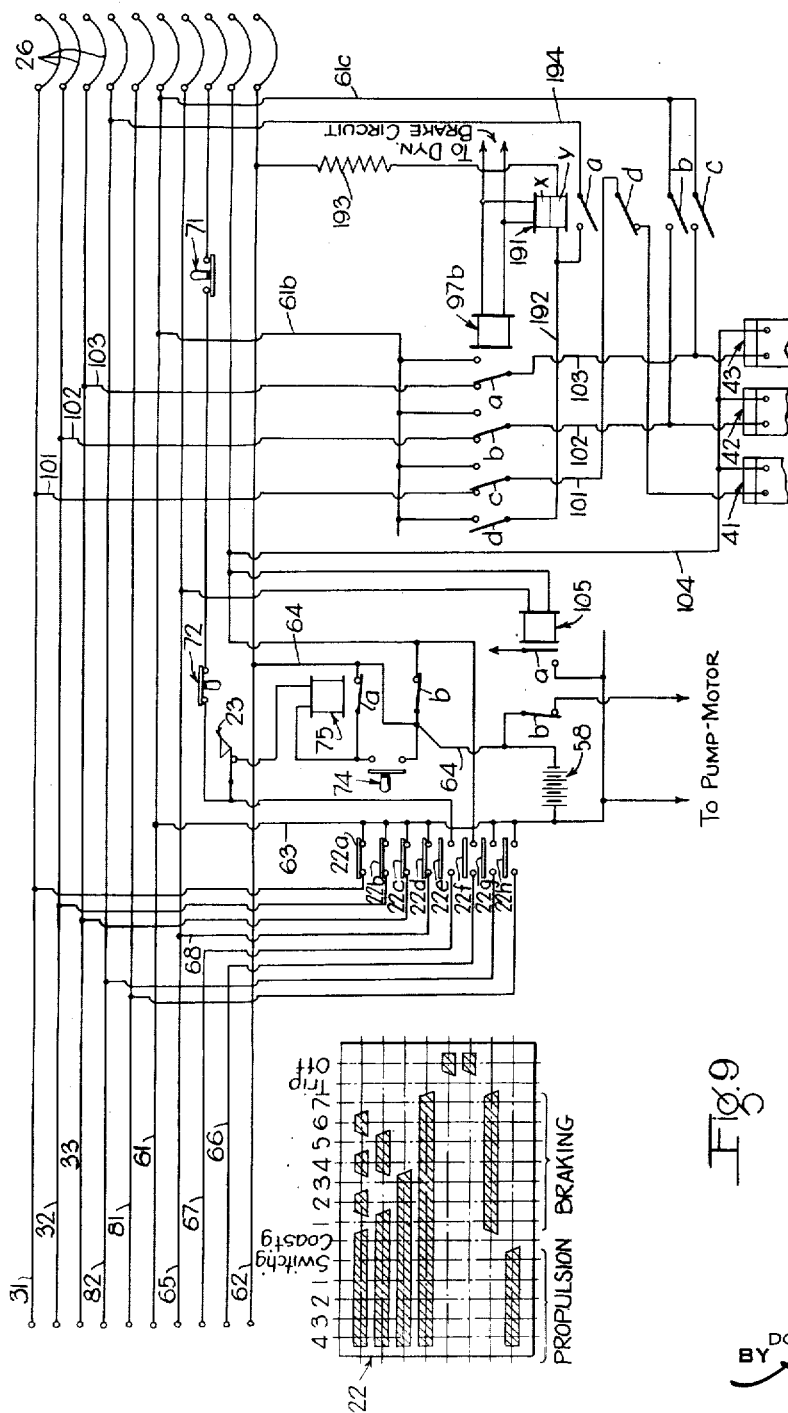

Fig. 5 is a fragmental diagrammatic view, showing how the system shown in Figs. 1A and 1B may be modified to provide normal deenergization of the magnet valves in the hydraulic circulatory system instead of normal energization thereof, Fig. 6 is a fragmental diagrammatic view, showing how the brake system of Figs. 1A and 1B may be modified to render the dynamic brake effective or ineffective to suppress the friction brake under the control of the operator of the vehicle, Fig. 7 is a fragmental diagrammatic view, indicating the manner in which the system of Fig. 6 may be modified for automatically rendering the dynamic brake effective or ineffective to suppress the friction brake depending upon the load carried by the vehicle as reflected in the response of an inertia device or retardation controller, Fig. 8 is a fragmental diagrammatic view, showing the manner in which the system of Fig. 6 may be modified to provide another type of apparatus responsive to the load on the vehicle for rendering the dynamic brake effective or ineffective to suppress the friction brake, and Fig. 9 is a fragmental diagrammatic view, showing a multiple-unit vehicle brake system similar to that in Figs. 1A and 1B except further characterized by an arrangement for distinguishing between the fading of the dynamic brake in normal manner with reducing vehicle speed and the undesired failure of the dynamic brake.

Figure 10:
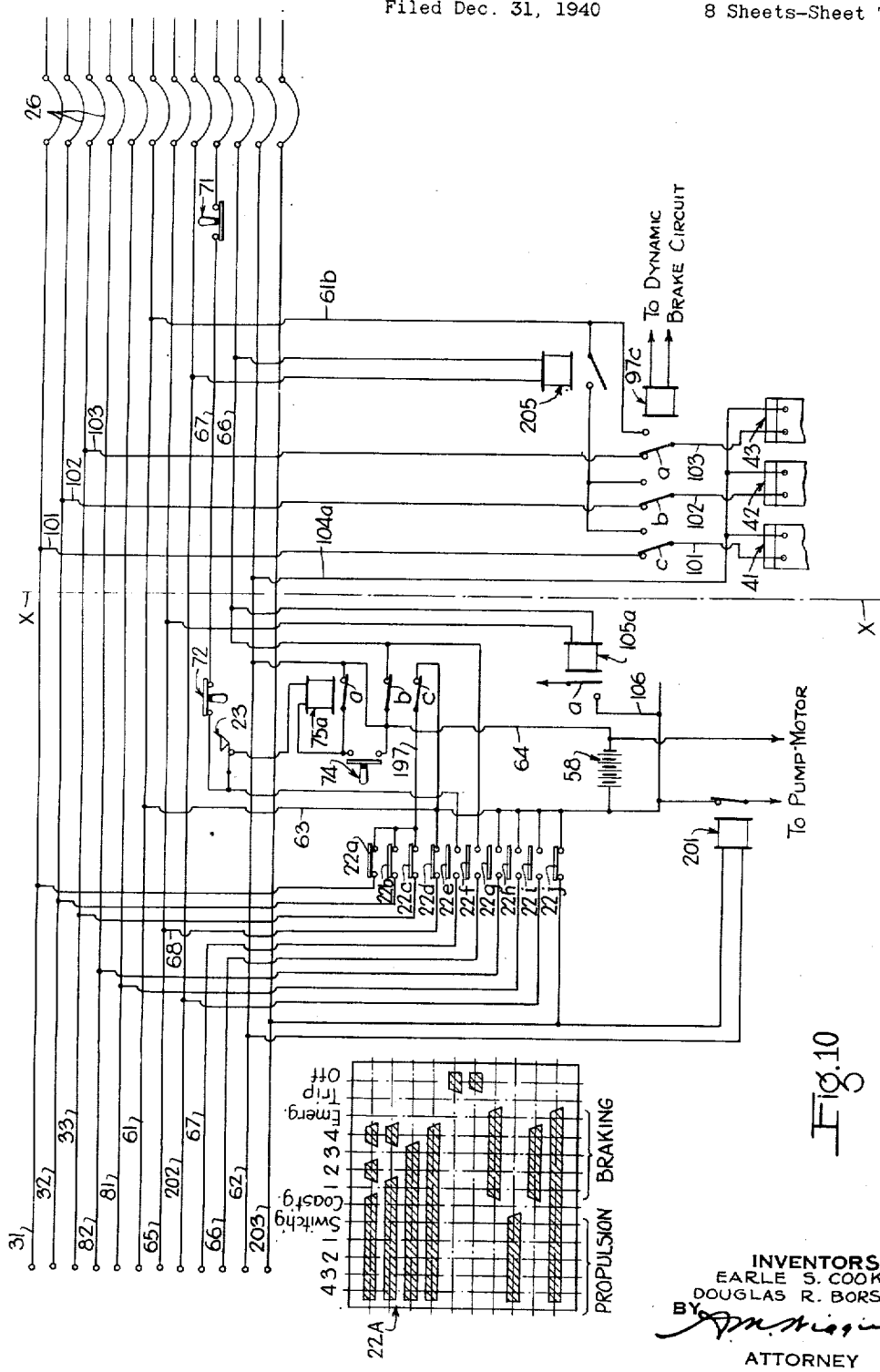

Fig. 10 is a fragmental diagrammatic view, showing a brake system similar to that of Figs. 1A and 1B except characterized by an arrangement whereby the dynamic brake is effective to wholly or partly suppress the friction brake depending upon the degree of application called for by the operator, and Fig. 11 is a fragmental view, showing the manner in which the system of Fig. 10 may be modified to embody the feature shown in Fig. 9.

*Description of embodiment shown in Figs. 1A and 1B*

Referring to the drawings, the equipment is shown in connection with a three car or unit train of the articulated type, the several units or cars being designated car 1, car 2 and car 3, respectively. As is usual in articulated trains the adjacent ends of successive units or cars are supported on a common wheel truck. Accordingly only four wheel trucks are required for the three unit train shown.

Each of the wheel trucks 11 is illustrated as of the two axle type each axle having two wheels 12. It will be understood that only one wheel per axle of each truck is shown in the drawing. The wheel trucks 11 are of any suitable conventional construction and details thereof are accordingly omitted for simplicity.

Carried on each wheel truck 11 are one or more brake cylinders 13, only one brake cylinder per truck being shown for simplicity. As indicated in the sectional view of brake cylinder 13 at the left of Fig. 1A, each cylinder is provided with a piston 15 having a rod or shaft 16 connected thereto for operating the brake shoes (not shown) associated with a friction surface such as the rim of the wheels 12 of the corresponding truck. Interposed between the piston 15 and one end of the cylinder is a coil spring 17 which is effective to urge the piston 15 in a direction to effect application of the brakes associated with the vehicle wheels. Movement of the piston 15 in opposition to the spring 17, to effect release of the brakes or to control the degree of application of the brakes is effected by means of a suitable hydraulic medium or liquid supplied under pressure to the chamber 18 at the side of the piston 15 opposite the spring 17 in the manner hereinafter to be described in detail.

Also carried on each of the wheel trucks 11 are two propulsion motors 21 which are respectively arranged in conventional manner to drive an individual wheel and axle unit. Motors 21 are of standard construction and, for simplicity, are indicated diagramamtically as comprising an armature winding 21a and a series field winding 21f. As will be made apparent hereinafter, the motors 21 are adapted to function as dynamic brakes.

For the purpose of enabling the control of the friction brakes operated by the brake cylinders 13 and the motors 21, either to propel the train or to act as dynamic brakes, a so-called master controller 22 is provided. For simplicity, we have shown only a single-end control equipment having a master controller 22 at the head end of car 1. It will be understood, however, that a double-end equipment may readily be provided in the conventional manner for providing a control station at opposite ends of the train.

Master controller 22 is shown diagrammatically but it will be understood that it may be of any suitable well-known construction in which a rotary operating shaft has a plurality of axially spaced cams affixed thereto for opening and closing cooperating contact fingers of switch devices in accordance with the rotary position of the shaft. In Fig. 1A, the switches operated by rotary movement of the operating shaft of the master controller 22 are designated 22a to 22h respectively.

The normal or neutral position of the operating shaft and its associated removable operating handle is designated "Coasting" position. As the rotary operating shaft is displaced rotarily in one direction from Coasting position, it traverses successively a plurality of braking positions designated 1 to 7 respectively, "Trip" position and "Off" position. The "Off" position of the operating shaft is the only position in which the operating handle of the controller may be removed.

In connection with the operating handle of the controller 22, a so-called "deadman" switch 23 is provided. Switches of this type associated with the operating handle of a controller are well-known and accordingly no description thereof is believed necessary except that as long as the operator exerts a downward pressure on the controller handle the switch 23 is closed, the removal of the downward pressure on the controller handle permitting the switch to open automatically.

Upon movement of the operating shaft of the controller in the opposite direction from its Coasting position, it traverses successively the propulsion positions designated "Switching" and 1 to 4.

Each of the cams of the controller shaft is indicated diagrammatically in Fig. 1A by cam elements on corresponding horizontal lines. It will be understood that, in the usual manner, the various switches 22a to 22h are on the same horizontal line, respectively as the cam element controlling them. Switches 22a to 22h are in open position for a position of the controller not covered by the corresponding cam element. Conversely the switches 22a to 22h are closed for a particular position of the controller covered by the corresponding cam.

As shown, the controller 22 is in the Coasting position thereof and thus the switches 22a, 22b, 22c and 22d are closed while switches 22e to 22h are in open position.

The equipment further comprises a number of train wires, hereafter to be identified and described, extending from car to car throughout the train. The sections of the train wires on successive units or cars may be connected in any convenient manner as through flexible connectors or cables 26.

Three of the train wires, hereinafter referred to as application control wires and designated respectively by the reference numerals 31, 32 and 33 are selectively energized and deenergized under the control of the controller switches 22a, 22b and 22c respectively for controlling three magnet valve devices 41, 42 and 43 which are a part of the hydraulic control apparatus adapted to control the pressure of the hydraulic medium supplied to the chambers 18 of the brake cylinders 13 of the corresponding car.

In addition to the magnet valves 41, 42 and 43, the equipment for hydraulically controlling the degree of application of the friction brakes effected by the brake cylinders 13 includes a suitable hydraulic pump 45 driven by a suitable direct current motor 46, a pipe or conduit 47 connected to the discharge port of the pump 45 and hereinafter referred to as the discharge pipe, a pipe 48 connected to the sump chamber or reservoir in the pump and hereinafter referred to as the return pipe, a pressure-relief or loaded check valve 49 and four choke-fittings 50, 51, 52 and 53.

The discharge pipe 47 has two branches one of which extends to and opens into the chamber 18 of the brake cylinder 13 for one wheel truck and the other of which opens into the chamber 18 of the brake cylinder 13 for the truck at the other end of the car.

The above-described apparatus including the magnet valves 41, 42 and 43 as well as the pump 45 and motor 46 are preferably carried on the body of the car and thus the branches of the discharge pipe 47 should contain flexible portions to allow for relative movement of the car body and wheel trucks.

The choke fitting 50 is interposed in the discharge pipe 47 and the several choke-fittings 51, 52 and 53 are arranged in parallel relation between the discharge pipe 47 and the return pipe 48, each choke-fitting being under the respective control of a corresponding magnet valve 41, 42 and 43. The loaded check valve 49 is interposed between the discharge pipe 47 on the high pressure side of the choke-fitting 50 and the return pipe 48. It may be adjusted to limit the maximum pressure on the high pressure side of the choke-fitting 50 to any selected value, such as one hundred pounds per square inch. When the pressure in the discharge pipe 47 on the high pressure side of the choke fitting 50 exceeds such pressure, the check valve 49 unseats and the excess fluid spills over into the return pipe 48.

The choke fittings 51, 52 and 53 are so designed with respect to each other and with respect to the choke fitting 50 that he pressure of the hydraulic medium on the low pressure side of the discharge pipe 47 effective in the chambers 18 of the brake cylinders 13 may be varied and controlled by selectively deenergized or energizing the magnet valves 41, 42 and 43 to provide any combination of the chokes 51, 52 and 53 effective to return fluid from the low pressure side of the choke fitting 50 in the discharge pipe 47 to the return pipe 48.

The magnet valves 41, 42 and 43 may be of any suitable construction and as diagrammatically shown each comprises a poppet valve 54 which is maintained seated on an associated valve seat in response to energization of a solenoid or magnet winding 55 in opposition to the yielding force of a spring 56 which shifts the valve 54 to unseated position when the magnet winding is deenergized. When the poppet valve 54 of any of the magnet valves 41, 42 and 43 is seated, the flow of fluid from the low pressure side of the choke fitting 50 in the discharge line 47 to the return pipe 48 through the associated choke fittings 51, 52 and 53 is prevented. Conversely, when the poppet valve is unseated, flow of fluid under pressure through the corresponding choke-fitting to the return pipe 48 is permitted.

The sizes of the choke fittings 51, 52 and 53 with respect to one another and the choke fitting 50 in the discharge pipe 47 may be such as to provide successive reductions or increases in the pressure of the fluid on the low pressure side of the choke fitting 50 in the discharge pipe 47 which may be substantially equal or in any desired relation. Thus, assuming for example that the magnet windings of all of the magnet valves 41, 42 and 43 are energized so that no fluid is discharged through any of the chokes 51, 52 and 53 from the discharge line 47 to the return pipe 48, the pressure established on the low pressure side of the choke fitting 50 and in the chambers 18 of the brake cylinder 13 will correspond substantially to the maximum pressure of the high pressure side of the choke fitting 50 in the discharge pipe 47 permitted by the loaded check valve 49. Let it be assumed that the maximum pressure in the chambers 18 of the brake cylinders 13 is in such case one hundred pounds per square inch and that such pressure is sufficient to overcome the force of the spring 17 to such a degree as to effect complete release of the friction brakes associated with the vehicle wheels.

If the magnet winding of only the magnet valve 41 is deenergized and only the choke fitting 51 rendered effective to reduce the pressure on the low pressure side of the choke-fitting 50 in the discharge pipe 47, a certain reduction such as ten pounds per square inch pressure in the chamber 18 of the brake cylinders 13 will be effected, assuming that the pump continues to operate and thereby maintain the maximum pressure on the high pressure side of the choke fitting 50 in the discharge pipe 47.

If the winding of only the magnet valve 42 is deenergized and only the choke-fitting 52 rendered effective, a reduction of for example twenty pounds per square inch in chamber 18 of the brake cylinders 13 may be effected. If the magnet windings of both the magnet valves 41 and 42 are simultaneously deenergized, a reduction of thirty pounds per square inch pressure in the chambers 18 of the brake cylinders 13 may be effected.

If only the magnet winding of the magnet valve 43 is deenergized so that only the choke fitting 53 is effective, the pressure in the chamber 18 of the brake cylinders may be reduced forty pounds. If the magnet windings of the magnet valves 41 and 43 are simultaneously deenergized so that choke fittings 51 and 53 only are effective, the pressure in the chamber 18 of the brake cylinders 13 may be further reduced as aggregate of fifty pounds. If the magnet windings of the magnet valves 42 and 43 are simultaneously deenergized so that the two choke fittings 52 and 53 are effective, the pressure in the brake cylinder chambers 18 may be further reduced an aggregate of sixty pounds.

If the magnet windings of all of the magnet valves 41, 42 and 43 are deenergized so that all of the choke fittings 51, 52 and 53 are effective, then the total reduction of the pressure in the brake cylinder chambers 18 may amount to seventy pounds per square inch.

It will thus be seen that by selectively energizing or deenergizing the magnet valves 41, 42 and 43 in different combinations, the hydraulic pressure in the brake cylinder chambers 18 may be varied so that the spring 17 in each cylinder is effective to apply the friction brakes with a corresponding force.

Energization and deenergization of the application control wires 31, 32 and 33 under the control of the master controller 22 is effected in such a manner that the greater the displacement of the operating shaft of the controller from its Coasting position into the braking zone, the greater is the reduction in the operating pressure in the brake cylinder chambers 18. The circuits whereby such control is effected will be hereinafter more specifically described in connection with an assumed operation.

In order to provide a supply of energizing current to the magnet valves 41, 42 and 43 as well as the pump motors 46 and other electrical control equipment hereinafter to be described, a suitable storage battery 58 is provided on each of cars 1 and 3. It will be understood that in accordance with the usual practice, suitable charging equipment for maintaining these batteries charged is provided although such equipment is omitted from the drawing for simplicity. The several batteries 58 on the train are connected in parallel by means of two of the train wires previously mentioned and hereinafter designated the positive battery wire 61 and the negative battery wire 62, the positive and negative terminal of the battery 58 being respectively connected to the positive and negative battery wires 61 and 62 by corresponding branch wires 63 and 64.

Three other train wires, designated by the reference numerals 65, 68 and 67, are respectively referred to hereinafter as the positive control wire, the negative control wire and the conductor's wire.

The positive control wire 65 is connected by a branch wire 68 including the controller switch 22b to the wire 63 and positive terminal of the battery 58 in all positions of the controller 22 except Trip and Off positions. A flexible connector 69 is provided at the rear end of car 3 for connecting the positive control wire 65 to the conductor's wire 67.

The conductor's wire 67 includes one or more conductor's switches 71 on the several cars and on at least one of the cars, such as car 1, a trip-switch 72. The conductor's switches 71 are normally closed and adapted to be manually operated to open position. In a similar manner, the trip-switch 72 is normally closed and is adapted to be opened in the usual manner by striking a stationary projection along the track.

When the master controller 22 is in all positions except the Off position, the controller switch 22e interrupts the connection between the rear-end section and the head-end section of the conductor's wire. Thus only when the controller 22 on car 1 is in Off position is the circuit of the conductor's wire continuous from the rear to the head end of car 1. The reason for such an arrangement will be made apparent hereinafter.

Interposed between the rear-end section of the conductor's wire on car 1 and the branch wire 64 of the negative battery wire 62 in a circuit subject to the deadman switch 23 and a so-called reset switch 74 is a reset relay 75.

The reset relay 75 is a normal type neutral relay having two front contacts a and b, that is contacts which are operated from an open to a closed position when the relay is picked-up. The contact a of reset relay 75 is a so-called "stick" contact which is effective to establish a self-holding circuit for the reset relay 75 in response to the initial pick-up of relay 75 by closing reset switch 74.

Contact b of reset relay 75 is effective in its picked-up or closed position to connect the negative control wire 66 to wire 64 and the negative terminal of the battery 58.

Since, in the drawings, it is assumed that the controller 22 is in Coasting position and that the conductor's switches 71, the trip-switch 72 and deadman switch 23 are closed and that the reset switch 74 has been operated to cause pick-up of the reset relay 75, the reset relay 75 is shown as stuck-up through its own self-holding contact a so that at the same time the negative control wire 66 is connected to the negative terminal of the battery 58 through the contact b of the reset relay 75.

The switch 22f of the master controller 22 is interposed in the negative control wire 66 on car 1 and establishes a connection from the rear to the head end section of the wire only in the Off position of the controller.

There are two remaining train wires, designated by the reference numerals 81 and 82, and hereinafter referred to respectively as the propulsion wire and the dynamic braking wire. The propulsion wire 81 is connected on car 1 through a branch wire 83 including the controller switch 22h to the branch wire 63 of the positive battery wire 61 in such a manner as to be energized only in the Switching and other propulsion positions 1, 2, 3 and 4.

Connected in parallel relation between the propulsion wire 81 and the negative control wire 66 are a pair of propulsion relays 85 and 86 respectively. The common connection from the windings of the relays 85 and 86 to the negative control wire 66 includes a back contact a of a dynamic relay 88 so that if the dynamic relay is picked up, the two propulsion relays 85 and 86 must necessarily be dropped-out.

The propulsion relays 85 and 86 are similar and each is provided with a back contact a and a front contact b. The back contact a of the propulsion relays 85 and 86 are interlock contacts in series circuit relation with the winding of the dynamic relay 88 for preventing energization or pick-up of the dynamic relay if the propulsion relays are picked-up.

The front contact b of the propulsion relays 85 and 86 are jointly effective when in their picked-up or closed positions to establish a power circuit in conventional manner whereby power current is supplied to the motors 21 to propel the car, from an external source, through a suitable trolley or collector device 91.

Included in the motor circuit is a suitable motor operated rheostat 92 which is controlled in conventional manner in response to variations of current in the motor circuit. For simplicity, the rheostat operating motor and the associated control apparatus therefore are omitted from the drawings since they are well known.

The dynamic relay 88 is a conventional relay of neutral type having the aforementioned back back contact a and two additional front contacts b and c. The winding of the dynamic relay 88 is included in a wire 94 having also the interlock contacts a of the propulsion relays 85 and 86 in series relation therein, the wire 94 being connected at one end to the dynamic braking wire 82 and at the other end to the negative battery wire 62.

The dynamic braking wire 82 is connected to the positive terminal of the battery 58 under the control of the controller switch 22g in all braking positions 1 to 7 of the controller 22 and thus the dynamic relay 88 is correspondingly picked-up.

When the dynamic relay 88 is picked-up, the front contacts b and c establish a dynamic braking circuit for the motors 21 including the rheostat 92. Although, not shown, it will be understood that the operating motor of the rheostat 92 is controlled in accordance with the dynamic braking current to vary the resistance of the rheostat to regulate the dynamic braking current to a substantially uniform selected value which may be varied in accordance with the displacement of the operating shaft of the controller 22 into the braking zone from the Coasting position in conventional manner. Thus the degree of dynamic braking effect produced by motors 21 increases progressively with the displacement of the controller out of its Coasting position into the braking zone.

Included in the dynamic braking circuit of the motors 21 is a potentiometer or resistor 96 so adjusted and arranged that the voltage therefrom is impressed on one winding of a double winding relay 97, hereinafter referred to as the suppression relay, and is effective to cause pick-up of the suppression relay as long as the dynamic braking current exceeds a certain value corresponding to a certain low speed of the train, such as eight miles per hour.

The suppression relay 97 is a conventional two winding relay, the aforementioned winding subject to the voltage of the potentiometer 96 being designated a and the other winding being designated b. Winding b of suppression relay 97 is entirely separate from the winding a and adapted to be independently energized by direct connection across the terminals of the battery 58 on the corresponding car under the control of a manually operated switch 98.

The suppression relay 97 is provided with three movable contacts designated c, d and e respectively. In the dropped-out position thereof, the contacts c, d and e of the suppression relay 97 establish connections through respective branch wires 101, 102 and 103 between one terminal of the magnet winding of the magnet valves 41, 42 and 43 and the application control wires 31, 32 and 33, the remaining terminals of the magnet valves being connected by a wire 104 to negative control wire 66.

In their picked-up positions, the contacts c, d and e of the suppression relay 97 interrupt the connection of the magnet windings of the magnet valves 41, 42 and 43 to the application wires 31, 32 and 33 and connect them all to the wire 63 connected to the positive terminal of the battery 58. Accordingly, when the suppression relay 97 is picked-up, the magnet windings of magnet valves 41, 42 and 43 are all energized independently of the application control wires 31, 32 and 33. Thus, as long as the dynamic braking current remains sufficient to pick up suppression relay 97, application of the hydraulically controlled friction brakes is suppressed.

Connected across the positive control wire 65 and the negative control wire 66 on each of cars 1 and 3 is a so-called emergency relay 105. The emergency relay 105 is provided with a back contact a and a front contact b. The back contact a is interposed in a wire 106 connected, at one end, to the wire 63 or positive terminal of the battery 58 and, at the other end, to the wire 94 in such manner that when the emergency relay 105 is dropped-out, contact a thereof establishes a connection for energizing or picking-up the dynamic relay 88 independently of movement of the controller 22 into the braking zone.

The front contact b of the emergency relay 105 is effective when in its picked-up or closed position to establish a circuit connecting the pump motor 46 directly across the terminals of the battery 58. An additional manually operated switch 107 in the motor circuit may be provided for interrupting the motor circuit whenever desired.

Operation of embodiment shown in Figs. 1a and 1b

Let it be assumed that the cars are at a standstill, that the master controller handle is in its Coasting position and that the reset relay 75 has been picked-up in response to closure of the reset switch 74 and "stuck" up through the self-holding contact a of the relay 75. Since the reset relay 75 connects the negative control wire 66 to the negative terminal of the battery 58 and the negative battery wire 62, the emergency relay 105 is picked-up as shown.

Assuming the manual switch 107 to be closed as shown, the motor 46 on each of cars 1 and 3 is accordingly operating the corresponding pump 45 which is, in turn, supplying liquid under pressure to the discharge pipe 47, liquid being discharged past the loaded check valve 49 to the return pipe 48 to limit the pressure in the discharge pipe 47 to a maximum normal value.

In the Coasting position of the master controller 22, the three switches 22a, 22b and 22c respectively connect the application control wires 31, 32 and 33 to the positive battery wire 61 and thus with the suppression relay 97 in its dropped-out position, the magnet windings 55 of all the magnet valves 41, 42 and 43 are energized. Accordingly the pressure builds up on the low pressure side of the choke-fitting 50 in the discharge pipe 47 to the equivalent of the pressure on the high pressure side, which pressure acting in brake cylinder chambers 18 effects release of the friction brakes.

To start the train, the operator shifts the controller handle out of the Coasting position into a desired propulsion position, for example, propulsion position 4. Switch 22h of the controller is accordingly closed and connects the propulsion wire 81 to the positive battery wire 61 and effects the consequent pick-up of propulsion relays 85 and 86. The propulsion circuit of the motors 21 is accordingly established and extends from the external source by way of the trolley or collector device 91, contact b of relay 85 through the series-parallel connected motors 21 and field windings 21f, contact b of relay 86 and rheostat 92 back to the external source of power as through a ground connection in the manner shown.

Since the controller has been displaced to the propulsion position 4, the motor operated rheostat 92 is so controlled in well known manner as to provide a maximum rate of acceleration of the motors 21.

Assuming now that the train has been accelerated to a uniform speed and is traveling along the road and that the operator desires to bring the train to a stop. To do so, the operator shifts the controller handle from the propulsion position to a desired braking position corresponding to the desired degree of braking for bringing the train to a stop. When the controller handle enters Coasting position, the switch 22h of the controller is opened and thus deenergizes the propulsion wire 81 and consequently the propulsion relays 85 and 86 which correspondingly drop-out. The consequent opening of the contacts b of the propulsion relays 85 and 86 interrupts the propulsion circuit of the motors 21 and the further supply of power current thereto.

When the controller handle is in the braking zone, that is the range of movement between braking position 1 and braking position 7, the switch 22g of the controller is closed to connect the dynamic braking wire 82 to the positive battery wire 61. Since the propulsion relays 85 and 86 have dropped out by this time, the dynamic relay 88 on each of cars 1 and 3 is correspondingly picked-up to establish the dynamic braking circuit for the motors 21 on the corresponding car. The dynamic braking circuit is readily apparent and needs no description.

Depending upon the particular braking position to which the controller handle is shifted, one or more of the application control wires 31, 32 and 33 is deenergized and consequently the corresponding magnet valves 41, 42 or 43 are momentarily deenergized. However, due to the rapid build-up of the dynamic braking current, the suppression relay 97 is promptly picked-up and thus the magnet windings 55 of the magnet valves 41, 42 and 43 are instantly reenergized if they were previously deenergized.

Thus it will be seen that as long as the dynamic braking current is sufficient to maintain the suppression relay 97 picked-up, the hydraulic pressure supplied to the brake cylinder chambers 18 will be maintained to effect the complete release of the friction brakes.

When the speed of the train reduces in response to the dynamic brake application to below a low speed, for example eight miles per hour, so that the dynamic braking current is insufficient to maintain the suppression relay 97 picked-up, contacts c, d, and e thereof are restored to their dropped-out positions. One or more of the magnet windings of the magnet valves 41, 42 or 43 is then deenergized depending upon the position of the controller handle. It will be apparent upon analysis that, if the controller handle is in braking position 1, only the application control wire 31 and consequently the magnet valve 41 is deenergized. Similarly, if the controller is in braking position 2, only the magnet valve 42 is deenergized. If the controller handle is in position 3, both the magnet valves 41 and 42 are deenergized. If the controller handle is in position 4, only the magnet valve 43 is deenergized. If the controller handle is in position 5, magnet valves 41 and 43 are deenergized. If the controller handle is in position 6, the magnet valves 42 and 43 are deenergized. If the controller handle is in position 7, then all of the magnet valves 41, 42 and 43 are deenergized.

As previously explained, the degree of reduction of the hydraulic pressure on the low pressure side of the choke-fitting 50 in the discharge pipe 47 and consequently in the brake cylinder chambers 18 depends upon the magnet valves 41, 42 and 43 deenergized and the consequent combination of chokes 51, 52 and 53 rendered effective. It will thus be apparent that the greater the displacement of the controller handle out of Coasting position, the greater is the reduction from the normal pressure in the brake cylinder chambers 18 and, correspondingly the greater is the degree of application of the friction brakes under the force of the spring 17.

The motor operated rheostat 92 is controlled in well-known manner according to the degree of displacement of the controller handle from Coasting position into the braking zone so that the degree of the dynamic braking current and consequently the dynamic braking effect increases in proportion to the displacement of the controller handle out of Coasting position. Thus, when the dynamic braking effect fails to develop initially when called for, a corresponding degree of application of the hydraulically controlled friction brakes is instantly effected.

In order to effect a release of the brakes prior to again starting the train, the operator merely restores the handle of controller 22 to its Coasting position wherein all of the magnet valves 41, 42 and 43 are again energized. Hydraulic pressure is thus again promptly restored in the brake cylinder chambers 18 and the friction brakes are promptly released.

If for any reason, such as a short-circuit or undesired ground occurring on any of the application control wires 31, 32 and 33, the restoration of the controller 22 to its Coasting position is ineffective to cause energization of all of the magnet valves 41, 42 and 43, the hydraulically controlled friction brakes will remain applied at least partially. In order to enable the train to proceed without immediately removing the fault on the application control wires, the manual switches 98 may be operated to closed position to energize the winding b of the suppression relay 97 directly from the battery 58 on the corresponding car. Suppression relay 97 is thus picked-up and causes energization of all of the magnet valves 41, 42 and 43 independently of the application control wires, so that the friction brakes are completely released. The manual switch 98 may be located in a convenient location accessible to the operator of the train or, in the case of a car other than that occupied by the operator, some other member of the train crew so that when it is desired to again bring the train to a stop, the switches 98 may first be opened to render the magnet valves 41, 42 and 43 subject to the control of the controller 22.

If while the train is traveling under power with the controller 22 in a certain propulsion position, any of the conductor's switches 71, the trip-switch 72 or the deadman switch 23 are opened, an emergency application of the brakes occurs independently of the controller 22.

It will be apparent that when any of the conductor's switches 71, trip-switch 72 or the deadman switch 23 are opened, the "stick" circuit maintaining the reset relay 75 picked-up is interrupted and the relay dropped-out. The opening of the front contact b of the reset relay 75 interrupts the connection between the negative control wire 66 and the negative battery wire 62. Consequently the propulsion relays 85 and 86 and the emergency relay 105 become deenergized and drop-out.

The restoration of the contacts b of propulsion relays 85 and 86 to their dropped-out or open position interrupts the circuit for supplying propulsion power to the motors 21.

The restoration of the back contact a of the propulsion relays 85 and 86 to their dropped-out or closed positions conditions the circuit of the dynamic relay 88 so that upon the restoration of the contact a of emergency relay 105 to its dropped-out or closed position, the circuit is established for energizing the dynamic relay 88 independently of the dynamic braking wire 82. This circuit extends from the positive terminal of the battery 58 on each of cars 1 and 3 by way of the wire 63, branch wire 106 including the contact a of the emergency relay 105 on the corresponding car, wire 94 including the series-connected contacts a of the two propulsion relays 85 and 86, and the winding of the dynamic relay 88 to the negative battery wire 62.

The dynamic relay 88 is effective when picked-up to establish the dynamic braking circuit for the motors 21 in the same manner as when effected under the control of the controller 22. Although not shown, it will be understood that when the reset relay 75 drops-out, the rheostat 92 is automatically controlled to cause the motors 21 to produce a maximum degree of dynamic braking effect.

The interruption of the connection between the negative control wire 66 and the negative battery wire 62 due to the drop-out of the contact b of reset relay 75 also interrupts the circuit for energizing the magnet windings of all of the magnet valves 41, 42 and 43 in view of the fact that the normal return circuit to the negative battery wire 62 is by way of the negative control wire 66.

At the same time due to the restoration of contact b of the emergency relay 105 to its dropped-out or open position, interrupting the circuit of the motor 46 on the corresponding car, each motor 46 stops promptly so that the pump 45 driven thereby is also promptly stopped.

Depending upon the type of pump, the stopping thereof may or may not result in the immediate dropping of the pressure in the discharge pipe 47. Thus in the case of a gear pump, centrifugal pump or rotary pump, the pressure in the discharge line or pipe 47 will drop promptly to atmospheric pressure whereas in the case of pumps employing valves or one-way or check valves in the discharge pipe, the pressure will not be reduced except as permitted through the chokes 51, 52 and 53.

Assuming, however, that the pumps 45 shown are of the gear type, the pressure in the discharge pipe 47 will reduce promptly to atmospheric pressure. The hydraulically controlled friction brakes will accordingly be applied simultaneously with the dynamic brakes. It is intended that the braking effect on the vehicle wheels 12 produced by the combined efforts of the dynamic brakes and friction brakes will not be such ordinarily as to produce sliding of the wheels.

It will be apparent that, during an emergency application of the brakes, when the dynamic braking current builds up sufficiently to cause pick-up of the suppression relay 95, the magnet windings of the magnet valves 41, 42 and 43 will not be energized directly from the battery 58 on the corresponding car because of deenergization of negative control wire 66 in response to drop-out of reset relay 75. Thus the choke-fittings 51, 52 and 53 are rendered effective to cause reduction of pressure in the discharge pipe 47 and the brake cylinder chambers 18 simultaneously with the reduction of the hydraulic pressure on the high pressure side of the choke-fitting 50 in the discharge pipe 47 due to the stoppage of the pump 45. This results in a correspondingly rapid reduction of the pressure in the brake cylinder chambers 18 and a consequent rapid application of the friction brakes to a maximum degree simultaneously with the dynamic brake application.

In order to release the brakes following an emergency application of the brakes effected as just described, it is first necessary for the operator to restore the controller handle to its Coasting position before operating the reset switch 74 to its closed position to reestablish the circuit for energizing the reset relay 75. If desired, the switch 74 may be a switch similar to the controller switches 22a to 22h and operated automatically to closed position only when the controller 22 is in its Coasting position, thereby necessitating the return of the controller handle to its Coasting position before permitting the operator to again start the train. This automatically reconditions the motor circuit and rheostat 92 for proper starting of the motors 21.

With the controller handle in its Coasting position and reset relay 75 picked-up and "stuck-up" through its own self-holding contact a as previously described, the circuit for energizing the magnet windings 55 of all the magnet valves 41, 42 and 43 is automatically re-established. At the same time, the emergency relay 105 is again picked-up and contact b thereof restored to its normal picked-up or closed position to cause starting of the motors 46 and the pumps 45 driven thereby. The hydraulic pressure in the discharge pipe 47 effective on the low pressure side of the choke-fitting 50 in the brake cylinder chambers 18 is thus rapidly built up to the maximum value determined by the setting of the loaded check valve 49 and the friction brakes are correspondingly released.

If it is desired to stop the train indefinitely for any reason in a desired place, or if the operator desires to change ends in the case of a double-end equipment, the train is brought to a stop in the usual manner by effecting an application of the brakes. Then the operator shifts the handle through Trip position to Off position and removes the handle.

It will be apparent that in the Trip position of the controller 22, as well as the Off position, all of the controller switches are opened except switches 22e and 22f which are closed only in the Off position of the controller.

It will thus be apparent that in the Off position of controller 22 the connections between the positive battery wire 61 and the application control wires 31, 32 and 33 as well as the dynamic braking wire 82, the propulsion wire 81, and the positive control wire 65 are interrupted. Consequently the magnet windings of all of the magnet valves 41, 42 and 43 are deenergized, the emergency relay 105 is deenergized so that the circuits for the motors 46 are correspondingly interrupted, and the various other relays including reset relay 75, propulsion relays 85 and 86, and the dynamic relay 88 are all deenergized. Thus when the train is stopped with the controller 22 in its Off position, no current is supplied or required from the battery 58 tending to cause exhaustion of the energy therein.

For simplicity, the connections of the batteries 58 to the positive battery wire 61 and the negative battery wire 62 are indicated as permanent connections. It will be understood, however, that if it is desired to interrupt the connections of the batteries 58 to the train wires 61 and 62, a suitable master circuit-breaker, not shown, may be employed for this purpose which will be automatically tripped open when the controller 22 is shifted into Trip position. In such case, the circuit-breaker will be operated to reestablish the connection between the batteries and the train wires 61 and 62 in response to the restoration of the controller handle to Coasting position. An example of such apparatus is shown and described in Patent 2,215,356 of Ellis E. Hewitt.

In the Off position of the controller 22, the controller switches 22e and 22f are closed and thereby complete the circuit through the conductor's wire 67 and the negative control wire 66 on car 1 from the head to the rear end. Accordingly if car 1 is coupled to the rear of another multiple unit train, the loop circuit from the head car of the train through the positive control wire 65 back through the conductor's wire 67 to the head car may be established. At the same time, the connection established by the reset relay 75 on the car having the controller at which the operator is stationed is effective to connect the negative control wire 66 on the control car to the negative battery wire 62 as described for car 1.

It will thus be apparent that whether the three car train described in the drawing is operated alone or in conjunction with other similar multiple-unit trains, the motors 21 and the magnet valves 41, 42 and 43 of the hydraulically controlled friction brakes as well as the motors 46 and pumps 45 on the various cars are controllable in exactly the same manner as previously described.

It will be understood that if other cars are added to the train following car 3, the flexible connector 69 connecting the positive control wire 65 and the conductor's wire 67 is removed from car 3 and installed on the end car of the train.

If desired, instead of the manually installed connector 69, an arrangement may be provided in well-known manner of train wire automatic couplers for establishing the connection between the positive control wire and the conductor's wire only on the end car at the rear of the train.

*Figure 2*

Referring to Fig. 2 of the drawings, a modified arrangement of the hydraulically controlled friction brake of the previously described embodiment is illustrated. Only so much of the apparatus of Fig. 2 as differs from the previous embodiment will be described, it being understood that corresponding parts are designated by the same reference numerals as in the previous embodiment.

The arrangement shown in Fig. 2 differs from the previous embodiment in that the friction brakes associated with the vehicle wheels are operated in accordance with the hydraulic pressure supplied to a brake cylinder 13a. Each brake cylinder 13a contains a piston 15a to which a shaft or rod 16a is fixed for operating the brake shoes in accordance with the hydraulic pressure exerted on the piston 15a. A release spring 17a is interposed between one side of the piston 15a and one end of the cylinder 13a for restoring the piston to a normal position in which the brake shoes are released.

The arrangement shown in Fig. 2 differs further from the previously described embodiment in providing a plurality of choke fittings 51a, 52a, 53a corresponding to the choke fittings 51, 52 and 53, adapted to be controlled by the magnet valves 41, 42 and 43 respectively. Moreover, the discharge pipe 47 is not provided with any choke-fitting corresponding to the choke-fitting 50 but a choke-fitting 50a is provided in a branch pipe 48a of the return pipe 48. The arrangement of the magnet valves 41, 42 and 43 is such as to control communication between the discharge pipe 47 and the high pressure side of the choke-fitting 50a in the branch pipe 48a selectively through one or more of the choke-fittings.

The arrangement of the choke-fittings 51a, 52a and 53a with respect to one another and the choke-fitting 50a and the relative sizes thereof are such as to produce different fluid pressures in the branch pipe 48a and the pressure chambers 18a at one side of the piston 15a in the brake cylinders 13a to which the pipe 48a is respectively connected by corresponding branches.

The loaded check valve 49 is interposed between the discharge pipe 47 and the low pressure side of the choke-fitting 50a to limit the maximum pressure developed in the discharge pipe to a certain desired value such as one hundred pounds per square inch.

It will be apparent that by selecting suitable sizes for the choke-fittings 51a, 52a and 53a relative to one another and to the choke-fitting 50a, the pressure of the fluid supplied to the brake cylinder chambers 18a and controlling the degree of application of the friction brakes may be varied progressively in desired steps by selectively deenergizing or energizing the magnet valves 41, 42 and 43 in corresponding combinations similarly to the combinations of the previous embodiment. Thus, for example, if the magnet winding of the magnet valve 41 only is deenergized, a fluid pressure of ten pounds per square inch may be developed in the brake cylinder chambers 18a; with only the magnet winding of the magnet valve 42 deenergized, the pressure developed in brake cylinder chambers 18a may be twenty pounds per square inch; with the magnet windings of both magnet valves 41 and 42 deenergized while the magnet winding of the magnet valve 43 remains energized, the pressure developed in the brake cylinder chambers may be thirty pounds per square inch; with only the magnet winding of the magnet valve 43 deenergized, the pressure developed in the brake cylinder chamber may be forty pounds per square inch; with the magnet winding of the magnet valves 41 and 43 deenergized while that of the magnet valve 42 is energized, a fluid pressure of fifty pounds per square inch may be developed in the brake cylinder chambers; with the magnet winding of the magnet valves 42 and 43 deenergized while that of the magnet valve 41 remains energized, a pressure of sixty pounds per square inch may be developed in the brake cylinder chambers; and with the magnet windings of all of the magnet valves deenergized, a pressure of seventy pounds per square inch may be developed in the brake cylinder chambers.

Furthermore, it will be apparent that since the application of the friction brakes in the apparatus of Fig. 2 requires continued operation of the motor 46 and pump 45, a different control arrangement of the motor circuit is necessary in Fig. 2 than in the previous embodiment. As indicated, therefore, the motor terminals are connected across the positive control wire 65 and the negative battery wire 62. It will thus be seen that unless the controller 22 is operated beyond braking position 7 into Trip or Off positions, the motor 46 will continue to drive the pump 45. Thus, in a conductor's or deadman emergency application of the brakes, all of the magnet valves 41, 42 and 43 are deenergized due to the drop-out of reset relay 75 and consequently a maximum degree of fluid pressure is supplied to the brake cylinder chambers 18a to cause application of the friction brakes at a maximum degree simultaneously with the dynamic brake application. As in the previous embodiment, pick-up of suppression relay 97 in response to dynamic braking current above a certain degree is not effective to energize the magnet valves 41, 42 and 43 due to the deenergization of negative control wire 66 by drop-out of reset relay 75 in an emergency application of the brakes.

Figure 3

Referring to Fig. 3, another arrangement is shown for automatically starting and stopping the motors 46 driving the pumps 45 in the apparatus of either of the two foregoing embodiments. This arrangement differs from the foregoing embodiments in providing a pressure reservoir or accumulator 111 in the discharge pipe 47 and a check valve 112 between the discharge port of the pump 45 and the reservoir 111 which prevents back flow of fluid under pressure from the reservoir to the pump.

When the pump 45 delivers fluid into the discharge pipe 47, the air in the space 113 above the level of the liquid in the reservoir 111 is compressed. A pressure operated switch 114 of any suitable construction responsive to the air pressure in the space 113 of the reservoir 111 is provided for controlling the connection between the terminals of the motor 46 and the battery 58. The pressure switch 114 is so designed that when the pressure in the space 113 above the level of the liquid in the reservoir 111 exceeds a certain value slightly higher than the setting of the loaded check valve 49 the switch is operated to open position and interrupts the circuit of the motor 46 which is thus stopped. Due to the check valve 112 preventing back flow of fluid from the reservoir 111 to the pump 45, pressure in the discharge pipe 47 is maintained by the pressure of the air above the liquid in the reservoir 111.

When the fluid released from the discharge pipe 47 under the control of the magnet valves 41, 42 and 43 is such as to reduce the air pressure in the space 113 above the liquid in reservoir 111 a certain amount, switch 114 automatically recloses the motor circuit and the motor again starts to operate pump 45.

Figure 4

Referring to Fig. 4 of the drawings, a different manner of controlling the magnet valves 41, 42 and 43 under the control of the master controller 22 and the suppression relay 97 is disclosed. In general, the system is the same as the first described embodiment and accordingly corresponding parts and elements are designated by the same reference numerals as in the first embodiment.

It will be observed that the cams on the rotary operating shaft of the controller 22 are so designed as to cause operation of the controller switches 22a, 22b and 22c in different sequence than in the first described embodiment.

Thus, controller switch 22c is opened in all braking positions of the controller as well as Trip and Off positions. Switch 22b is opened in braking positions 5, 6 and 7, as well as Trip and Off positions. Switch 22a is opened only in braking positions 4, 6 and 7, as well as Trip and Off positions.

Furthermore, the suppression relay 97 is provided with but a single contact for controlling the magnet winding of the magnet valve 43, the magnet valves 41 and 42 being independent of the suppression relay. In this connection, it will be seen that in the dropped-out position of the suppression relay 97 a circuit through the branch wire 103 from the application control wire 33 to the one terminal of the magnet winding of the magnet valve 43 is completed. Also, when the suppression relay 97 is picked-up, the single contact thereof is actuated to interrupt the circuit through the branch wire 103 and establish a direct connection from a branch wire 61a of the positive battery wire 61 to the one terminal of the magnet winding of the magnet valve 43.

In operation, therefore, it will be seen that when the controller 22 is shifted into any of the braking positions 1, 2 or 3, the dynamic brakes are applied in varying degrees according to the displacement of the controller handle out of its Coasting position and application of the friction brakes is suppressed until the suppression relay 97 drops out due to reduction of the dynamic braking current with reducing vehicle speed. When the suppression relay 97 drops out, the magnet valve 43 is deenergized and consequently the friction brakes are applied to a degree determined by the reduction of the hydraulic pressure active in the brake cylinder chambers 18. On the basis of the illustrative figures given in connection with the first embodiment, the deenergization of the magnet valve 43 will result in a reduction of forty pounds per square inch pressure in the brake cylinder chambers 18, thus providing a substantial degree of application of the friction brakes.

If the controller 22 is shifted to the braking position 4, the degree of application of the dynamic brakes is correspondingly increased but as distinguished from previous controller brake positions, the application of the friction brakes is not entirely suppressed due to the deenergization of the magnet winding of the magnet valve 41. Thus, with the controller in braking position 4, the friction brakes are applied to a certain degree, determined by the deenergization of the magnet valve 41, simultaneously with the increased degree of dynamic brake application. When the suppression relay 97 drops out at low vehicle speed, the magnet valve 43 is again deenergized and the degree of application of the friction brakes correspondingly increases.

If the controller 22 is shifted to its braking position 5, the friction brakes are simultaneously applied with the dynamic brakes due to the deenergization of the magnet winding of the magnet valve 42, the degree of application of friction brakes being greater than for braking position 4. It will be apparent that such is the case on the basis of the illustrative figures previously given where it was assumed that the deenergization of the magnet valve 41 alone would result in a reduction of ten pounds per square inch pressure in the brake cylinder chambers 18 whereas the deenergization of the magnet valve 42 alone would result in a reduction of twenty pounds per square inch pressure in the brake cylinder chambers 18. With the controller in braking position 5, the drop-out of the suppression relay 97 results in the deenergization of the magnet valve 43 and the consequent increase in the degree of application of the friction brakes.

If the controller 22 is shifted to braking positions 6 or 7, the magnet valves 41 and 42 are simultaneously deenergized and consequently the friction brakes are applied together with the dynamic brakes to a degree determined by the combined effect of the two magnet valves. On the basis of illustrative figures previously given, the deenergization of both magnet valves 41 and 42 will result in a reduction of thirty pounds per square inch pressure in the brake cylinder chambers 18. When the suppression relay 97 is dropped-out, the magnet valve 43 is deenergized and consequently the degree of application of the friction brakes is increased proportionately. On the basis of illustrative figures previously given, it will be seen that with the controller 22 in braking positions 6 and 7, the deenergization of the magnet valve 43 results in a reduction of seventy pounds per square inch pressure in the brake cylinder chambers 18, thus effecting a maximum degree of application of the friction brakes.

It will be apparent that in the case of a deadman or conductor's switch application of the brakes, the reset relay 75 will be dropped-out as in the first embodiment and consequently all of the magnet valves 41, 42 and 43 will be deenergized. In such instances, therefore, no suppression of the friction brakes will occur and the friction brakes will be applied to a maximum degree simultaneously with the application of the dynamic brakes to a maximum degree. The pickup of suppression relay 97 will be ineffective to cause energization of the magnet valve 43 because of the interruption of the return circuit of the magnet valve 43 by deenergization of the negative control wire 66 in response to dropout of reset relay 75.

Figure 5

In previous embodiments, the magnet valves 41, 42 and 43 are normally energized in the Coasting position of the controller 22 so as to effect the release of the friction brakes. In Fig. 5 an arrangement is shown whereby magnet valves 41a, 42a and 43a corresponding to the magnet valves 41, 42 and 43 respectively are provided and controlled through the medium of relays 121, 122 and 123 respectively so as to be deenergized in the Coasting position and all propulsion positions of the controller 22. Such an arrangement is advantageous in that less power consumption is required and consequently less drain of energy from the batteries 58 occurs.

As will be seen in Fig. 5, the relays 121, 122 and 123 are controlled respectively by energization and deenergization of the application control wires 31, 32 and 33 in the same manner as the magnet valves 41, 42 and 43 of previous embodiments. The relays 121, 122 and 123 are similar in that each has a single back contact that, in the Coasting or propulsion positions of the controller 22, is operated to the picked-up or opened position interrupting individual circuits including the magnet windings of the magnet valves 41a, 42a and 43a respectively.

In the arrangement shown in Fig. 5, a suppression relay 97a is provided which is controlled in exactly the same manner as in the first embodiment. The suppression relay 97a has three back contacts c, d and e which respectively control the energizing circuits of the magnet windings of the magnet valves 41a, 42a, and 43a. Thus, when the suppression relay 97a is picked-up, the several circuits for energizing the magnet windings of the magnet valves 41a, 42a and 43a are interrupted and energization of the magnet valve windings prevented independently of the control exercised by the relays 121, 122 and 123. When the suppression relay 97a drops-out, the magnet winding circuits of the magnet valves are respectively and selectively established depending upon which of the relays 121, 122 and 123 are dropped-out under the control of the master controller 22.

The magnet valves 41a, 42a and 43a differ somewhat from the magnet valves 41, 42 and 43 in having a pressure-balanced slide valve 125 which is normally biased upwardly by a spring 126 to close a communication between the discharge pipe 47 and the return pipe 48 including the corresponding choke-fittings 51, 52 and 53 or 51a, 52a and 53a. Upon energization of the magnet winding 127 of the magnet valves, the slide valve 125 is shifted to a position establishing communication through the corresponding choke-fitting between the discharge pipe 47 and the return pipe 48 or branch pipe 48a.

Figure 6

The equipment shown in Fig. 6 differs essentially from the equipment of the first embodiment shown in Figs. 1A and 1B in providing additional means for rendering the various suppression relays 97 optionally effective or ineffective under the control of the operator of the vehicle, for a desired purpose, such as to compensate for variations of load carried on the train.

Specifically, the equipment shown in Fig. 6 differs from the equipment shown in Figs. 1A and 1B in providing an additional train wire 131, a relay 132 having a single back contact controlling the connection of the winding a of the suppression relay 97 to the potentiometer or resistor 96, and a manually operated switch 133 located conveniently for operation by the operator of the train.

The winding of the relay 132 is connected by branch wires 134 and 135 across the positive control wire 65 and the additional train wire 131.

The switch 133 is arranged to connect the wire 131 to the negative battery wire 62 or to disconnect its therefrom.

It will thus be seen that with the switch 133 open, the relay 132 is deenergized and the back contact thereof establishes the connection whereby the winding a of the suppression relay 97 is responsive to the current in the dynamic braking circuit. Conversely, with the switch 133 closed, the relay 132 is picked-up and its back-contact interrupts the connection between the winding a of the suppression relay 97 and the potentiometer 96, thereby rendering the suppression relay 97 unresponsive to the current in the dynamic braking circuit.

The operator may, therefore, optionally render the suppression relay 97 effective or ineffective to suppress the application of the hydraulically controlled friction brakes in accordance with any operating condition of the vehicle, such as load, speed, or rate of retardation. For example, if the train is carrying an excessively heavy load, the operator may close the switch 133 thus rendering the suppression relay 97 unresponsive to dynamic braking current so that when an application of the brakes is initiated, the dynamic brake and the hydraulically controlled friction brake are applied simultaneously to a degree determined according to the displacement of the handle of the controller 22 out of its Coasting position.

If the load carried by the train is relatively light, the operator may open the switch 133 and thereby render the suppression relay 27 effective to suppress the hydraulically controlled friction brakes until the dynamic braking current reduces sufficiently in response to the reducing speed of the train.

It will be observed that with the controller 22 in its Trip and Off positions, the positive control wire 65 is disconnected from the positive terminal of the battery 68 and the positive battery wire 81. Consequently, when the train is out of service, the relay 132 is automatically deenergized independently of whether the switch 133 is open or closed.

Whenever a conductor's or deadman emergency application of the brakes is effected, the hydraulically controlled friction brakes are applied simultaneously with the dynamic brakes because in such case the suppression relay 97 is ineffective to energize the magnet valves 41, 42 and 43 even though it is picked-up in response to dynamic braking current. In this respect, the apparatus of Fig. 6 is identical with that shown in Figs. 1A and 1B.

It will thus be apparent that, in a conductor's or deadman emergency application of the brakes, the position of the switch 133 and the consequent energization or deenergization of the relay 132 is immaterial for the reason that suppression of the hydraulically controlled friction brakes is prevented in every case as just explained.

*Figure 7*

The apparatus shown in Figure 7 illustrates one type of mechanism to be substituted for the manually operated switch 133 of Fig. 6 for automatically controlling the interlock relay 132 automatically in response to variations of the load carried by the train.

Essentially the mechanism comprises an inertia device of the pendulum type operatively responsive according to the rate of retardation of the train. As illustrated diagrammatically, a retardation controller 137 is provided comprising a suitable casing in which an inertia element in the form of a pendulum 138 is pivotally suspended as on a shaft or pin 139 carried by the casing. The pendulum 138 is normally yieldingly held in a centered position by suitable springs 141 on opposite sides thereof, the tension of which may be adjusted by suitable adjusting screws 142 provided with suitable lock nuts 143. The casing of the retardation controller 137 is securely fastened to the body of one of the cars of a train and thus the pendulum 138 swings in either direction from the central position thereof an amount proportional to the rate of retardation of the train. By suitably designing and adjusting the springs 141, the displacement of the pendulum 138 may be suitably controlled so as to operate a switch device presently to be described, in a desired manner. As diagrammatically shown, the lower arcuate surface of the pendulum 138 may be provided with gear teeth 144 adapted to mesh with a pinion 145 fixed on a shaft 146 suitably journaled in the casing. Also fixed on the shaft 146 is a cylinder of insulating material 147 having a contact segment 148 inset in flush relation to the peripheral surface thereof for cooperating with a pair of stationary contacts 149 carried by the casing of the retardation controller.

The stationary contacts 149 are respectively connected by wires 151 and 152 to the train wire 131 and the negative battery wire 82.

In operation, with the pendulum 138 in its centered position, the contact segment 148 on the cylinder 147 connects the two stationary contacts 149 thereby effecting energization of the interlock relay 132 to cause pick-up of the back contact thereof in the manner shown to interrupt the circuit of the coil a of the suppression relay 97.

When the displacement of the pendulum 138 in either direction from the center position exceeds a certain amount, occurring only when the rate of retardation of the train exceeds a certain rate, such as three miles per hour per second, the contact segment 148 disengages one or the other of the stationary contacts 149, thus interrupting the energizing circuit for each relay 132 on each of the cars so equipped. In such case, the restoration of the back contact of relay 132 to its dropped-out or closed position renders the coil a of suppression relay 97 responsive to current in the dynamic braking circuit and effective to cause suppression of the hydraulically controlled friction brakes.

It will be apparent that if the train is heavily loaded so that, upon application of the brakes, the displacement of the pendulum 138 of the retardation controller 137 is insufficient to cause deenergization of the relay 132, then the suppression relay 97 will be ineffective to suppress the hydraulically controlled friction brake and they will be applied simultaneously with the dynamic brakes.

Conversely if the load carried by the train is relatively light, the displacement of the pendulum 138 upon application of the brakes will exceed that required to interrupt the energizing circuit of the relay 132 and the relay will therefore drop-out and render the suppression relay 97 effective to suppress the hydraulically controlled friction brakes until such time as the dynamic braking current reduces sufficiently with reducing vehicle speed or unless the dynamic brakes fail.

*Figure 8*

Referring to Fig. 8, another type of apparatus responsive to the load carried by a car or train for controlling the interlock relay 132 on each car so equipped in the equipment shown in Fig. 6 is disclosed.

This arrangement includes a relay 155 which is controlled jointly by a door-operated switch device 156 and a load-responsive switch device 157, the relay 155 being effective to control the circuit of the interlock relay 132 on the corresponding car or unit.

The door-operated switch device 156 comprises two separate switches 158 and 159 of the telephone type adapted to be closed in succession in response to the movement of a door on a car to its closed position. As shown, the switches 158 and 159 comprise flexible resilient contact fingers secured at one end in an insulating base 161, the pair of contact fingers constituting each switch being adapted to separate automatically when the tension thereon is released. A suitable mechanism such as a slidable rod 162 having lugs 163 and 164 thereon in spaced relation may be provided for operating the switches 158 and 159 in accordance with the movement of a door 165.

The load responsive switch device 157 comprises a switch 166 of the telephone type adapted to be operated by pivotal movement of an arm or lever 167. The lever 167 and the switch 166 are carried as on a bracket 168 attached to a "sprung" or spring-supported part 169 of a car in such a manner that the outer end of the lever 167 is adapted to engage a suitable bearing member 171 attached to an "unsprung" or non-sprung-supported part 172 of a vehicle or car truck.

Also carried by the bracket 168 is a retrieving solenoid 173 effective, when energized, to elevate a plunger 174 pivotally connected to the lever 167 to correspondingly elevate the lever.

When the retrieving solenoid 173 is deenergized, the lever 167 drops of its own weight and assumes a position limited by the engagement of the outer end thereof with a bearing member 171 on the unsprung part 172 of the wheel truck. If the car is loaded less than a certain degree, the angle through which the lever 167 drops when the retrieving solenoid 173 is deenergized is sufficient to effect closure of the switch 166. If the load on the car is in excess of this certain degree, the distance between the sprung part 169 and the unsprung part 172 of the wheel truck is reduced, the unsprung part assuming a position relative to the sprung part in the manner indicated by the broken lines. Thus, upon deenergization of the retrieving solenoid, the angle through which lever 167 falls is insufficient to cause closing of the switch 166.

In operation, let it be assumed that the load on the car is sufficiently light that, with the retrieving solenoid 173 deenergized, the switch 166 is closed. The circuit for energizing the retrieving solenoid 173 is under the control of the switch 159 of the door-operated switch device 156, the solenoid 173 being connected in series relation with the switch 159 across the positive control wire 65 and the negative battery wire 62. When the door 165 is opened, the switch 159 automatically opens thereby deenergizing the solenoid 173 allowing lever 167 to drop.

Now when the door 165 is reclosed prior to starting the train, switch 158 closes prior to switch 159. Switch 158 is effective when closed, while the load-responsive switch 166 is closed, to effect energization of the winding of the relay 155, this circuit extending from the positive control wire 65 by way of a branch wire 176, wire 177, switch 166, a wire 178, winding of the relay 155, a wire 179, door-operated switch 158, and a wire 181 to the negative battery wire 62.

Relay 155 has a front contact a and a back contact b. Contact a of relay 155 is connected in parallel with the load-responsive switch 166 and thus serves as a self-holding or "stick" contact for the relay 155, once the relay winding is energized, independently of whether or not the switch 166 is subsequently opened.

The reason that the switches 158 and 159 of the door-operated switch device 156 are arranged to be closed in succession in the order named should now be apparent for it is necessary that the relay 155 is picked up and its self-holding circuit established before the retrieving solenoid 173 is energized by the closing of the switch 159 for otherwise the opening of the switch 166 would prevent the establishment of the self-holding circuit for the relay 155.

The back contact b of relay 155 is connected in series relation with the winding of the interlock relay 132 across the positive control wire 65 and the negative battery wire 62. Accordingly when the relay 155 is picked-up, its back contact is actuated to its open position to cause deenergization of the relay 132. The back contact of the relay 132 accordingly drops to its closed position establishing the circuit for energizing the winding a of the suppression relay 97 in accordance with the current in the dynamic braking circuit. Thus it will be seen that in the case of a load on a car less than a certain degree, the suppression relay 97 is rendered effective to suppress the hydraulically controlled friction brakes until the dynamic brake application fades toward the end of the stop.

When the train is brought to a stop and the door 165 is opened, switches 158 and 159 are opened, thereby interrupting the self-holding circuit of the relay 155 and deenergizing the retrieving solenoid 173. Now if the load on the car is increased above a certain degree so that the lever 167 is ineffective to close the switch 166, the subsequent closing of the door 165 will be ineffective to complete the circuit for energizing the winding of the relay 155, and consequently the relay 155 will not be picked-up. In such case, therefore, the contact b of relay 155 completes the circuit for energizing the interlock relay 132 and the back contact of the latter relay is picked-up to open the circuit of the winding a of the suppression relay 97, thereby rendering the suppression relay unresponsive to dynamic braking current.

Thus, it will be seen that if the load on the car exceeds a certain degree, the suppression relay 97 will be rendered ineffective and the hydraulically controlled friction brakes will be applied simultaneously with the dynamic brake when an application of the brakes is initiated.

It will be understood that the reason for raising the lever 167 out of contact with the bearing member 171 on the unsprung part 172 of the wheel truck while the train is in motion is to prevent the undesired chattering and wear of parts resulting from vibration due to the relative motion of the sprung and unsprung parts of the wheel truck.

Figure 9

In the foregoing embodiments of our invention, there is no distinction between fading of the dynamic braking effect in the normal manner due to reducing vehicle speed and the failure of the dynamic brake means to develop braking effect, as far as the effect of the suppression relay 97 in suppressing the application of the friction brakes is concerned. In Fig. 9 an arrangement is shown for distinguishing automatically between fading of the dynamic braking effect in the normal manner due to reducing vehicle speed and failure of the dynamic brake means to produce braking effect, to the end that if the dynamic braking effect fades in normal manner after being effective, one certain degree of friction brake application will be automatically effected and if the dynamic braking effect fails, either initially or during an application of the brakes, then an application of the friction brakes to a degree higher than the one certain degree will be produced.

It will be apparent that when the dynamic braking effect is sufficient to provide adequate braking for the vehicle during the major portion of the stopping distance, the friction brakes need only be applied to a relatively low degree in order to provide the necessary braking effect to bring the vehicle to a smooth stop without unnecessary shock. On the other hand, if the dynamic brakes fail to develop the necessary braking for any reason when called for, the demands of safety require that the friction brakes provide the necessary braking effect to supplant that of the dynamic brakes. The arrangement shown in Fig. 9 is accordingly a desirable one in that it distinguishes automatically between the fading of the dynamic braking effect in the normal manner and the undesired failure of dynamic braking effect to the end that the degree of application of the friction brakes be suitably controlled in the manner above indicated.

In describing the apparatus shown in Fig. 9, only so much of the equipment as differs from the first embodiment disclosed in Figs. 1A and 1B will be pointed out, it being understood that in other respects the equipments will be identical and the corresponding parts and elements will be designated by the same reference numerals. For convenience and simplicity, certain parts of the equipment including the propulsion motors 21, propulsion relays 85 and 86, and dynamic relay 88 have been omitted from Fig. 9 but it will be understood that such parts are included in the equipment and operate in the same manner as in the first described embodiment.

The equipment of Fig. 9 differs from the first described embodiment in providing a suppression relay 97b controlled according to the current in the dynamic braking circuit of the propulsion motors, the relay 97b being shown as having a single magnet winding and four contact members a, b, c and d.

In their dropped-out positions, the contacts a, b and c of suppression relay 97b establish the several circuits through the branch wires 103, 102 and 101 respectively to the magnet windings of the corresponding magnet valves 43, 42, and 41. In their picked-up positions, the contacts a, b and c interrupt the circuits through the branch wires 103, 102 and 101, respectively, and establish a connection between a branch wire 61b of the positive battery wire 61 to the portion of the wires 103, 102 and 101 connected directly to the magnet winding of the magnet valves 43, 42 and 41, thereby energizing the magnet valves independently of the application control wires 31, 32 and 33 and controller 22.

The equipment shown in Fig. 9 differs further from that of the first described embodiment in providing a differential relay 191 having two separate windings $x$ and $y$ respectively, three front contacts a, b and c, and a back contact d.

The winding $x$ of the differential relay 191 is connected in parallel relation with the winding of the suppression relay 97b and is thus correspondingly energized and deenergized in accordance with the current from the dynamic braking circuit of the propulsion motors 21.

The winding $y$ of the relay 191 is connected in a wire 192 including in series relation therewith contact d of the suppression relay 97b and a resistor 193, the wire 192 being connected at its one end to the branch wire 61b of the positive battery wire 61 and at its other end to the negative battery wire 62. Contact d of suppression relay 97b is a front contact and is thus in open position deenergizing the winding $y$ of relay 191 when the suppression relay 97b is dropped-out. When the relay 97b is picked-up the contact d thereof is actuated to its closed position to effect energization of the winding $y$ of the relay 191, the resistor 193 suitably limiting and controlling the energizing current through the winding.

The winding $x$ of the relay 191 is so wound as to bias or urge the armature carrying the contacts of the relay to its dropped-out position. Winding $y$ of the relay 191 is wound in opposition to the winding $x$ so as to tend to cause pick-up of the contacts of the relay. The windings $x$ and $y$ of the relay 191 are so designed with respect to each other that as long as the dynamic braking current is sufficient to maintain the suppression relay 97b picked-up, the contacts of the relay 191 will be maintained in their dropped-out positions. Slightly before the time that the suppression relay 97b drops-out in response to reducing dynamic braking current, the predominating effect of the winding $y$ of relay 191 over that of the winding $x$ will be effective to cause pick-up of the contacts of the relay 191.

The contact a of relay 191 is effective when actuated to its picked-up or closed position to establish a "stick" or self-holding circuit for the winding $y$ of the relay 191. For this purpose, the contact a of relay 191 is interposed in a wire 194 that connects the dynamic braking wire 82 and the wire 192 at a point between the contact d of relay 97b and the winding $y$ of the relay 191. Accordingly, since the dynamic braking wire is connected to the positive battery wire through controller switch 22g in all braking positions of the controller 22, it will be seen that once the relay 191 is picked-up it remains "stuck-up" by means of the "stick" circuit including its own front contact a.

The back contact d of relay 191 is effective when dropped-out to close the circuit through that portion of branch wire 101 connecting the one terminal of the magnet winding 41 to the contact c of suppression relay 97b. The contacts b and c of the relay 191 are effective when picked-up to respectively connect the terminals of the magnet windings 42 and 43, to which the branch wires 102 and 103 are connected, to a branch wire 61c of the positive battery wire 61.

It will thus be seen that if the relay 191 is picked-up, the contact d will interrupt the energizing circuit of the magnet winding of the magnet valve 41 and the contacts b and c of the relay 191 will establish circuits for energizing the magnet windings of the magnet valves 42 and 43 independently of the application control wires 31, 32 and 33 and the position of the controller 22.

In order to further understand the operation of the equipment shown in Fig. 9 let it be assumed that the operator initiates an application of the brakes by operation of the controller 22 to any given one of the seven braking positions.

The dynamic braking circuit for the propulsion motors 21 will be established as in the first described embodiment, the degree of application of the dynamic brakes corresponding to the degree of displacement of the controller handle out of its Coasting position. Suppression relay 97b will function when picked-up in response to the dynamic braking current to establish the circuits for energizing the magnet windings of all of the magnet valves 41, 42 and 43, thereby suppressing or preventing application of the hydraulically controlled friction brakes.

At the same time, winding y of the differential relay 191 is energized due to closing of the contact d of the suppression relay 97b but, in view of the fact that the winding x of the relay 191 is sufficiently energized in response to dynamic braking current, the contacts of the relay 191 remain in their dropped-out positions for the time being.

Slightly before the dynamic braking current reduces sufficiently to cause drop-out of the suppression relay 97b, the effect of the current energizing the winding y of the differential relay 191 predominates sufficiently over that energizing winding x to cause pick-up of the contacts of the relay 191, thereby causing the relay 191 to be "stuck-up" by reason of the "stick" circuit including its own contact a. When the suppression relay 97b drops-out, therefore, the magnet winding of the magnet valve 41 is already deenergized because the contact d of relay 91 is in its picked-up or open position. At the same time, the respective magnet windings of the magnet valves 42 and 43 remain energized due to the fact that the contacts b and c of the relay 191 are already in their picked-up or closed positions.

In view of the fact, as previously assumed, that deenergization of the magnet winding of only the magnet valve 41 produces the first step of reduction in the hydraulic pressure effective in the brake cylinder chambers 18, namely ten pounds per square inch, it will be seen that when the dynamic braking effect fades in a normal manner at the time the speed of the vehicle reduces to a low value, the hydraulically controlled friction brakes are applied to a low degree sufficient to provide adequate braking to bring the car to a smooth stop without excessive shock.

Now let it be assumed that when the operator shifts the controller handle to a braking position to initiate an application of the brakes, the dynamic braking circuit is not established, due to some undesired fault, and consequently the motors 21 fail to provide dynamic braking. In such case, the suppression relay 97b is not picked-up. Since the contact d of the suppression relay 97b is not actuated to its picked-up or closed position, the winding y of the relay 191 is never energized. Consequently the differential relay 191 cannot be picked-up.

It will be apparent, therefore, that the magnet windings of the magnet valves 41, 42 and 43 will be energized or deenergized in accordance with the particular braking position of the controller 22 as described for the first embodiment. Obviously therefore the friction brakes will be applied to a degree corresponding to the degree of dynamic brake application called for and such friction brake application will be maintained unless the operator varies the position of the controller handle during the stop to either increase or decrease the degree of application.

If the dynamic braking circuit is interrupted in an undesired manner during an application of the brakes after initiation thereof, the relay 191 is not picked-up and the same result occurs as just described, that is, the friction brakes are applied to a degree corresponding to the braking position of the controller handle. Such is the case, because the counter-electromotive force developed in the winding of the suppression relay 97b upon the failure of the dynamic braking circuit maintains the winding x of the differential relay 191 energized sufficiently long to prevent pick-up of relay 191 before the drop-out of the contact d of the relay 97b and the consequent deenergization of the winding y of the winding 191 occurs. Consequently, the winding y is not effective to cause pick-up of the relay 191 when the current through the winding x of the relay 191 dies away.

In the event of interruption of the conductor's wire 67 due to operation of the conductor's switch 71, trip switch 72, or deadman switch 23, the reset relay 75 is dropped-out as in the first embodiment, thereby effecting interruption of the connection between the negative control wire 66 and the negative battery wire 62. The magnet windings of the magnet valves 41, 42 and 43 are all consequently deenergized simultaneously and pump motor 46 stops as in the first described embodiment. The pick-up of the suppression relay 97b in response to the dynamic braking current is ineffective, as in the first embodiment, to cause energization of the magnet windings of the magnet valves 41, 42 and 43 due to the drop-out of the reset relay 75. Thus in an emergency brake application, of the type described, the dynamic brakes and the friction brakes are simultaneously applied in the same manner as in the first described embodiment. The fact that the differential relay 191 may be picked-up and remain stuck-up is of no consequence since the return circuit for the magnet windings of the magnet valves 41, 42 and 43 is interrupted due to the drop-out of the reset relay 75.

It will be apparent that whenever the handle of the controller 22 is restored to its Coasting position, the stick circuit for the winding y of the relay 191 is interrupted due to opening of controller switch 22g, and the contacts of the relay 191 are thus restored to their dropped-out positions if they have been actuated to their picked-up positions during the brake application.

*Figure 10*

Another equipment is shown in Fig. 10, similar in general to the equipment disclosed in Figs. 1A and 1B but differing therefrom in certain respects hereinafter to be pointed out. For simplicity only the difference with respect to the first described embodiment will be pointed out and described, it being understood that the remaining portion of the equipment is identical to the first described embodiment and the corresponding parts and elements are designated by the same reference numerals.

The equipment shown in Fig. 10 provides for complete suppression of the friction brakes under the control of the dynamic brakes for service applications and only partial suppression of the friction brakes under the control of the dynamic brakes in an emergency application initiated by operation of a controller 22A corresponding to the controller 22 of previous embodiments.

It will be noted that the controller 22A differs from controller 22 in providing only four service braking positions designated positions 1, 2, 3 and 4 and an emergency position following braking position 4 instead of the seven service braking positions of controller 22.

The operation of the controller switches 22a, 22b and 22c of controller 22A is in part the same as for controller 22. That is, in braking position 1 only the switch 22a is open; in braking position 2 only the switch 22b is opened; in braking position 3 switches 22a and 22b are both opened; and in braking position 4 only the switch 22c is opened.

In the Emergency position of controller 22a all of the switches 22a, 22b and 22c are opened, as they are in Trip and Off positions. As distinct from controller 22, the switch 22d of controller 22A is closed in all propulsion positions, Coasting position, and Braking positions, 1, 2, 3 and 4, being open in Emergency position, Trip and Off positions.

It will thus be apparent that when the handle of controller 22A is shifted to its Emergency position, the positive control wire 65 controlled by the switch 22d is disconnected from the positive battery wire 61, thus interrupting the loop circuit including the conductor's wire 67 for energizing the winding of a reset relay 75a corresponding to the reset relay 75.

The reset relay 75a differs from the reset relay 75 in having an additional front contact c which is interposed in a wire 197 connecting the switches 22a, 22b and 22c of the controller 22A to the branch wire 63 of the positive battery wire 61. At the same time, the terminals of the magnet windings of the magnet valves 41, 42 and 43, opposite to that to which the branch wires 101, 102 and 103 are connected, are connected by a branch wire 104a directly to the negative battery wire 62, so that the return circuit of the magnet windings of the magnet valves is independent of the reset relay 75a although the circuits are controlled nevertheless by the contact c of the reset relay 75a.

The equipment shown in Fig. 10 differs from that in the first described embodiment by providing an emergency relay 105a which differs from the emergency relay 105 in having only a single back contact a which functions in the same capacity as the contact a of emergency relay 105, namely to establish a circuit for energizing the dynamic relay 88 when the emergency relay drops-out.

For a reason which will be made apparent hereinafter, the pump motors 46 are controlled independently of the emergency relay 105a by means of a motor-circuit relay 201 controlled by operation of the controller 22A in a manner presently to be described.

The controller 22A differs further from the controller 22 in having two additional switch contacts 22i and 22j. As evidenced by the contour of the cam elements opposite the switches, switch 22i is closed only in braking positions 1 to 4 and switch 22j is closed in all positions of the controller except Trip and Off positions.

Controller switches 22i and 22j respectively control the connection of two additional train wires 202 and 203 respectively to the positive battery wire 61 through its branch wire 63.

The winding of the relay 201 on the individual cars of the train is connected across the wire 203 and the negative battery wire 62 and is consequently energized in all positions of the controller 22A except Trip and Off positions. The relay 201 has a single contact which is effective when the winding of the contactor is deenergized, to open the circuit to the pump motor 46 and, when the winding of the relay is energized, to close the motor circuit to cause it to operate the associated pump 45. It will thus be seen that the operator on one of a plurality of cars may by means of the controller 22A control the starting and stopping of the pump motors 46 of the several cars of a train.

The equipment shown in Fig. 10 further includes an auxiliary relay 205, the winding of which is connected across the train wire 202 and the negative control wire 66. Since the train wire 202 is connected to the positive battery wire 61 through switch 22i of the controller 22A only in the service braking positions 1, 2, 3 and 4, it will be seen that the winding of the relay 205 is energized only in such positions of the controller. The relay 205 has a single contact which is effective when actuated to its picked-up or closed position to connect one set of stationary contacts associated with contacts b and c of a suppression relay 97c, corresponding to the suppression relay 97b, to branch wire 61b of the positive battery wire 61 and to interrupt such connection when restored to its dropped-out or open position. The corresponding stationary contact associated with contact a of suppression relay 97c is connected directly to the branch wire 61b independently of the auxiliary relay 205. Supression relay 97c differs from relay 97b in that it does not have a contact d.

It will thus be apparent that when the contacts a, b, and c of suppression relay 97c are actuated to their picked-up positions in response to the current in the dynamic braking circuit, the winding of the magnet valve 43 is always energized whereas the windings of the magnet valves 41 and 42 are energized in response to pick-up of relay 97c only if the relay 205 is picked-up.

In order to further understand the operation of this equipment, let it be assumed that the operator initiates a service application of the brakes by shifting the handle of the controller 22A to a brake position, such as brake position 3. The dynamic braking circuit for the propulsion motors 21 will be established as in previous embodiments and a dynamic braking effect produced in accordance with the degree of displacement of the controller handle out of Coasting position.

At the same time, due to the fact that the auxiliary relay 205 is picked-up, the pick-up of the suppression relay 97c is effective to establish a circuit for energizing the magnet windings of the magnet valves 41, 42 and 43 independently of the position of the controller 22a. Accordingly, the application of the friction brakes is suppressed as long as the dynamic braking effect remains sufficiently effective to maintain the suppression relay 97c picked-up.

When the suppression relay 97c drops-out, as it does normally at a low vehicle speed, control of the magnet windings of the magnet valves 41, 42 and 43 is restored to the controller 22A. In the assumed instance where the controller is in braking position 3, the circuits for energizing the magnet windings of magnet valves 41 and 42 will be opened and the magnet windings deenergized due to the fact that the application control wires 31 and 32 are disconnected from the positive battery wire 61 at controller switches 22a and 22b respectively. As the vehicle comes to a stop, therefore, the hydraulically controlled friction brakes are applied to a degree corresponding to the particular combination of magnet valves deenergized.

Let it now be assumed that the operator initiates an emergency application of the brakes by shifting the handle of the controller 22A to its Emergency position.

In such case, the dynamic braking circuit for the propulsion motors 21 is established as in previous embodiments and the maximum dynamic braking effect is produced.

At the same time, due the opening of the controller switch 22d and the consequent disconnection of the positive control wire 65 from the positive battery wire 61, the reset relay 75a is deenergized and the contacts thereof restored to their dropped-out positions. Due, therefore, to the opening of the switches 22a, 22b and 22c of the controller 22A as well as the opening of the contact c of the reset relay 75a, the circuit for energizing the magnet valves 41, 42 and 43 is interrupted.

Due to the fact, however, that the auxiliary relay 205 is dropped-out in the Emergency position of the controller 22A, the pick-up of the suppression relay 97c in response to dynamic braking current is ineffective to cause energization of the magnet windings of the magnet valves 41, 42 although it is effective to cause energization of the magnet winding of the magnet valve 43. It will thus be apparent that when an emergency application of the brakes is initiated by the controller 22A, the hydraulically controlled friction brakes are applied partially to a degree determined by the deenergization of the magnet valves 41 and 42 simultaneously with the application of the dynamic brakes.

When the dynamic braking effect reduces at a low vehicle speed sufficiently to cause drop-out of the suppression relay 97c, magnet valve 43 is restored to the control of the controller 22A and consequently the magnet valve 43 becomes deenergized. The degree of application of the hydraulically controlled friction brakes is correspondingly increased to the maximum value as the vehicle comes to a stop.

It will be apparent that opening of a conductor's switch 71, trip switch 72, or deadman switch 23 will result in an emergency application of the brakes in exactly the same manner as for operation of the controller 22A to Emergency position, although the controller may be in a propulsion position at the time, due to the fact that the stick circuit for reset relay 75a is interrupted as in previous embodiments. Thus although the controller switches 22a, 22b and 22c may be in closed position, the drop-out of the reset relay and the corresponding opening of the contact c thereof will effect deenergization of the magnet windings of all of the magnet valves 41, 42 and 43. At the same time since the return circuit for the magnet windings of the magnet valves 41, 42 and 43 is established directly to the negative battery wire 62 independently of the reset relay 75a, the pick-up of the suppression relay 97c in response to dynamic braking current is effective to cause energization of the magnet winding of magnet valve 43.

The reason for controlling the pump motors 46 in Fig. 10 by relays 201 under the control of controller 22A instead of by emergency relay 105a should now be apparent. Obviously, in order to maintain liquid pressure in the brake cylinder chambers 18 to prevent full application of the friction brakes during an emergency application and while suppression relay 97c is still picked-up in response to dynamic braking current, the motors 46 must continue to operate the pumps 45. However, relay 105a is dropped-out in the emergency position of controller 22A as well as upon interruption of the conductor's wire 67 due to drop-out of reset relay 75a, and if the pump motors were controlled by corresponding relays 105a, the pumps would stop in emergency brake applications. The pump motors 46 are accordingly controlled by relays 201 so as to be stopped only when the controller is shifted beyond emergency position to Trip and Off positions.

*Figure 11*

Referring to Fig. 11, a modification of the equipment shown in Fig. 10 is disclosed whereby certain features of the equipment shown in Fig. 9 are embodied therein. For simplicity only so much of the equipment is shown in Fig. 11 as is necessary to point out differences with respect to the equipment of Fig. 10, it being understood that if Fig. 11 is superimposed on Fig. 10 with the broken line X—X coinciding with the broken line X—X of Fig. 10, the remainder of the equipment may be apparent.

The equipment shown in Fig. 11 differs from that in Fig. 10 in employing the suppression relay 97b of Fig. 9 and the differential relay 191 of Fig. 9 in combination with the auxiliary relay 205 of Fig. 10.

In Fig. 11, the auxiliary relay 205 is effective in its picked-up position to establish the connection whereby when suppression relay 97b is picked-up, the contacts b and c thereof are effective to energize the magnet windings of the magnet valves 41 and 42 as in Fig. 10. In addition, however, the contact of the relay 205 also controls a connection whereby when the contact d of suppression relay 97b is actuated to its picked-up position, a circuit is established for energizing a winding y of the differential relay 191.

It will thus be apparent that when the relay 205 is dropped-out, the suppression relay 97b is ineffective, when picked-up, to cause energization of the magnet windings of the magnet valves 41 and 42 and of the winding y of the differential relay 191.

As distinguished from the equipment of Fig. 9, the "stick" circuit for the winding y of the differential relay 191 is established differently by connecting the wire 194 including the "stick" contact a of relay 191 to the train wire 202 controlled by switch 22i of the controller 22A. Thus, if the controller 22A is shifted to its Emergency position, the "stick" circuit for winding y of relay 191 through its own contact a cannot be established.

To further understand the operation of the equipment shown in Fig. 11, let it be assumed that the operator initiates a service application as by shifting the handle of the controller 22A to brake position 3. In such case, the dynamic braking circuit of the propulsion motors 21 is established as in previous embodiments and, at the same time, the application control wires 31 and 32 are deenergized. Upon the pick-up of the suppression relay 97b, the magnet valves 41, 42 and 43 are energized directly from the positive battery wire 61 independently of the application control wires, as in Fig. 9. The application of the hydraulically controlled friction brakes is accordingly completely suppressed.

When the dynamic braking current reduces sufficiently at low vehicle speed to cause the suppression relay 97b to drop-out, the differential relay 191 will have been previously picked-up and "stuck-up" as in the embodiment shown in Fig. 9.

Therefore, when the suppression relay 97b drops-out due to fading of dynamic braking effect, the magnet valve 41 only will be deenergized due to the open position of contact *d* of differential relay 191, and magnet valves 42 and 43 will be energized due to the closed contacts *b* and *c* respectively of the relay 191.

It will be seen, therefore, that in the equipment of Fig. 11, the application of the hydraulically controlled friction brakes is completely suppressed while the dynamic brake is effective, and established to a low degree when the dynamic braking effect fades at low vehicle speed. This operation corresponds identically to the operation of the equipment shown in Fig. 9 for service applications of the brakes.

If the dynamic braking effect fails to develop when called for or fails at any time during a service application of the brakes, the magnet valves 41, 42 and 43 are restored to the control of the controller 22A as in the embodiment of Fig. 9 and consequently the friction brakes are applied to a degree determined by the service braking position of the controller 22A.

Let it now be assumed that, in the equipment of Fig. 11, the operator initiates an emergency application of the brakes by shifting the controller handle to its Emergency position. The dynamic braking circuit for the propulsion motors 21 will be established as in Fig. 9 to effect dynamic braking to a maximum degree. At the same time, due to the fact that the auxiliary relay 205 is deenergized and dropped-out, the pick-up of the suppression relay 87*b* in response to the dynamic braking current is ineffective to cause energization of the magnet windings of the magnet valves 41 and 42 and of the winding *y* of the differential relay 191.

It will thus be apparent that only the magnet valve 43 is energized in response to the actuation of the contact *a* of the suppression relay 87*b* to its picked-up or closed position and consequently the hydraulically controlled friction brakes are applied simultaneously with the dynamic brakes to a degree determined according to deenergization of the magnet valves 41 and 42. In this respect the operation resembles that of the equipment shown in Fig. 10 and differs from that of the equipment shown in Fig. 9.

When the dynamic braking current reduces sufficiently at low speed to cause drop-out of the suppression relay 87*b*, the magnet valve 43 is restored to the control of controller 22A and is therefore deenergized. The degree of application of the friction brakes is thus increased to the full or maximum value. Obviously, since the winding *y* of differential relay 191 was never energized, and since in any event the "stick" circuit therefor through its own contact *a* could not be established in the Emergency position of the controller 22A because controller switch 22*i* is open and interrupts the connection of train wire 202 to wire 63 and the positive battery wire 61, the relay 191 will not be picked-up when the suppression relay 87*b* drops out and consequently the magnet valves 42 and 43 cannot be energized under the control of the relay 191.

Operation of the conductor's switch 71, trip switch 72, or deadman switch 23 will initiate an emergency application of the brakes in substantially the same manner as by operation of the controller 22A to its Emergency position since the contact *c* of the reset relay 75*a* will be restored to its open position deenergizing all of the application control wires 31, 32 and 33 controlling the magnet valves 41, 42 and 43. Thus application of the friction brakes simultaneously with the dynamic brakes to a degree determined by deenergization of the magnet valves 41 and 42 will be effected in such case, followed by an increase in the degree of application of the friction brakes when the suppression relay 87*b* drops-out at low vehicle speed.

*Summary*

Summarizing, it will be seen that we have disclosed a novel arrangement for controlling the hydraulic pressure in a circulatory system so as to vary the degree of application of friction brakes associated with an element to be braked.

It will be further apparent that we have disclosed several arrangements of brake apparatus adapted for multiple-unit vehicles, including a dynamic brake in combination with the hydraulically controlled friction brake mentioned above, whereby the application of the dynamic brake and the hydraulically controlled friction brake may be coordinated in such a manner as to cause the friction brake to be either wholly or partly suppressed under the control of the dynamic brake as long as the dynamic brake remains effective above a certain degree.

It will also be apparent that we have disclosed various arrangements for variously coordinating the application of the dynamic and friction brakes according to the load on the vehicle or according to the degree of application called for by the operator.

It will further be seen that we have disclosed a brake apparatus including a dynamic brake and a friction brake in which the friction brake is wholly suppressed under the control of the dynamic brake as long as the dynamic brake is effective above a certain degree and then causing application of the friction brake to a low degree, which apparatus is automatically effective if the dynamic brake fails to become or be effective at any time to cause application of the friction brakes promptly to a degree determined by the operator of the vehicle.

While we have shown and described only certain specific embodiments of our invention, it will be apparent that various omissions, additions or modifications may be made in the embodiments shown without departing from the spirit of our invention. It is accordingly not our intention to limit the scope of our invention except in accordance with the terms of the appended claims.

Having now described our invention, what we claim as new and desire to secure by Letters Patent, is:

1. Brake apparatus for exerting a braking force on an element to be braked, said apparatus comprising a communication for containing liquid under pressure, a pump for supplying liquid under pressure to said communication, a choke element interposed between said communication and said pump for controlling the rate of supply of liquid into said communication from said pump, a plurality of choke elements so arranged as to individually or collectively in different combinations release liquid from said communication at a plurality of different rates, means for selectively rendering one or more or all of said plurality of choke elements effective or ineffective to release liquid from said communication whereby to cause to be established in said communication a different pressure for each combination of said plurality of choke elements in effect or not in effect, and means controlled according to the pressure in said communication for controlling the degree of application and the release of the brakes.

2. Brake apparatus for exerting a braking force on an element to be braked, said apparatus comprising a communication for containing liquid under pressure, a pump for supplying liquid under pressure to said communication, a plurality of parallel-related choke elements of different sizes respectively interposed between said pump and said communication, means for rendering one or more or all of said plurality of choke elements effective or not effective to permit the supply of liquid therethrough selectively in different combinations, a choke element for releasing liquid from said communication, the pressure established in said communication for any given liquid pressure delivered by said pump being different for each corresponding combination of said plurality of choke elements in effect, and means responsive to the pressure in said communication for controlling the degree of application and the release of the brakes.

3. Brake apparatus for exerting a braking force on an element to be braked, said apparatus comprising a pump, a discharge communication through which liquid is discharged from said pump, a return communication through which liquid is returned to said pump at reduced pressure, a pressure-relief valve device for causing pressure in said discharge communication to be a substantially constant normal value, means providing an intermediate communication, means for controlling the rate of supply of liquid from said discharge communication into said intermediate communication, means for controlling the rate of release of liquid under pressure from said intermediate communication to said return communication, said two controlling means cooperating to establish selectively a plurality of different liquid pressures in said intermediate communication for a given liquid pressure in said discharge communication, and means controlled according to the liquid pressure in said intermediate communication for controlling the degree of application and the release of the brakes.

4. Brake apparatus for exerting a braking force on an element to be braked, said apparatus comprising a hydraulic pump, a discharge communication through which liquid under pressure is discharged from said pump, a return communication through which liquid is returned to said pump at reduced pressure, means providing an intermediate communication, a choke element for controlling the rate of supply of liquid from said discharge communication into said intermediate communication, a plurality of parallel related choke elements of different sizes respectively adapted to permit the return of liquid therethrough from the intermediate communication to the return communication, means for selectively rendering one or more or all of said plurality of choke elements effective or ineffective to permit the release of liquid from said intermediate communication to said return communication whereby to cause a plurality of different liquid pressures to be established in said intermediate communication each of which pressures corresponds to a particular combination of the parallel-related choke elements in effect or not in effect, and means subject to the liquid pressure in said intermediate communication for controlling the degree of application and the release of the brakes.

5. Brake apparatus for exerting a braking force on an element to be braked, said apparatus comprising a hydraulic pump, a discharge communication into which liquid under pressure is discharged from said pump, a return communication through which liquid at reduced pressure is returned to said pump, means providing an intermediate communication, a plurality of parallel-related choke elements, of different sizes respectively, interposed between the discharge communication and the intermediate communication for permitting the flow of liquid therebetween, means for selectively rendering one or more or all of said parallel-related choke elements effective or not effective to permit the flow of liquid from the discharge communication to the intermediate communication, a choke element interposed between said intermediate communication and said return communication through which liquid flows from said intermediate communication to said return communication, the liquid pressure established in said intermediate communication for a given liquid pressure in said discharge communication being different for each particular combination of parallel-related choke elements in effect or not in effect, and means responsive to the liquid pressure in said intermediate communication for controlling the degree of application and the release of the brakes.

6. Brake apparatus for exerting braking force on an element to be braked, said apparatus comprising a hydraulic pump, a motor device for operating said pump, means including a reservoir providing a communication through which liquid under pressure is discharged from said pump, a one-way valve interposed between said reservoir and pump in a manner to prevent back flow of liquid from said reservoir to said pump, means providing a communication through which liquid is returned to said pump at a reduced pressure, means providing an intermediate communication, means for controlling the rate of supply of liquid under pressure from said discharge communication to said intermediate communication, means for controlling the rate of return of liquid from said intermediate communication to said return communication, said two controlling means cooperating to establish selectively any one of a plurality of different liquid pressures in said intermediate communication for a given pressure in said discharge communication, means controlled according to the liquid pressure in said intermediate communication for controlling the degree of application and the release of the brakes, and means responsive to the pressure in said reservoir for controlling the starting and stopping of the motor device.

7. Vehicle brake apparatus comprising, in combination, means providing a communication for containing liquid under pressure, means including a pump for supplying liquid at a given pressure to said communication, a motor device for driving said pump, a first choke means for controlling the rate of supply of liquid under pressure from said pump to said communication, a second choke means for controlling the rate of release of liquid under pressure from said communication, manually operative means for controlling the said second choke means to establish selectively in said communication any one of a plurality of different liquid pressures for a given liquid pressure supplied by said supply means, means controlled according to the liquid pressure in said communication for controlling the degree of application and the release of the brakes on the vehicle, and means controlled by said manually operative means for controlling the starting and stopping of the said motor device.

8. Vehicle brake apparatus comprising, in combination, means providing a communication for containing liquid under pressure, means including a pump for supplying liquid at a given pressure to said communication, a motor device for driving said pump, choke means controlling the rate of supply of liquid under pressure into said communication, a plurality of parallel-related choke devices for controlling the rate of release of liquid under pressure from said communication, manually operated means having a plurality of different operating positions for controlling the said parallel-related choke devices to open and close them in any one of a plurality of different combinations to establish selectively any one of a plurality of different liquid pressures in said communication corresponding respectively to the different operating positions of the manually operative means, means controlled according to the liquid pressure in said communication for controlling the degree of application and the release of the brakes on the vehicle, and means effective in one position of the manually operative means for causing the motor device to stop and in other positions to operate.

9. Vehicle brake apparatus comprising, in combination, means providing a communication for containing liquid under pressure, means including a pump for supplying liquid at any given pressure to said communication, a first choke means controlling the rate of supply of liquid under pressure to said communication from said pump, a second choke means controlling the rate of release of liquid under pressure from said communication, manually operative means for controlling the said second choke means in a manner to establish selectively any one of a plurality of different pressures in said communication for a given liquid pressure supplied by said supply means, additional means effective, upon operation, independently of the manually operative means for so controlling the said second choke means as to establish one certain uniform pressure in said communication, and means controlled according to the liquid pressure in said communication for controlling the degree of application and the release of the brakes on the vehicle and effective in response to said one certain uniform pressure to effect the maximum degree of application of the brakes.

10. Brake apparatus for a multiple-unit vehicle comprising, in combination, means on one or each of more than one of the units providing a communication for containing liquid under pressure, a pump on each of the units having the aforesaid communication for supplying liquid at a given pressure to said communication, a plurality of choke means for controlling the rate of supply of liquid under pressure into said communication from said pump and the release of liquid under pressure from said communication on each unit so equipped, a plurality of train wires extending from unit to unit throughout the vehicle, a plurality of electro-responsive means controlled according to energization and deenergization of said train wires respectively for opening and closing certain of said choke means on each unit so equipped whereby to establish selectively in said communication of the corresponding unit any one of a plurality of different liquid pressures for any given liquid pressure delivered by the pump, an additional train wire extending from unit to unit throughout the vehicle effective upon interruption to so control the plurality of electroresponsive means on each of the units so equipped as to establish in the communication on the corresponding unit one certain uniform liquid pressure, and means on each of the units having the aforesaid communication responsive to the liquid pressure in the communication for controlling the degree of application and the release of the brakes on the corresponding unit and effective in response to the said one certain uniform pressure to cause application of the brakes to a maximum degree.

11. Vehicle brake apparatus comprising, in combination, means providing a communication for containing liquid under pressure, a pump carried on the vehicle for supplying liquid at a given pressure to said communication and receiving liquid at a reduced pressure from said communication, a motor device for driving said pump, a plurality of choke means for controlling the rate of supply of liquid under pressure from said pump to said communication and the rate of release of fluid under pressure from said communication to said pump, manually operative means for controlling the said plurality of choke means in a manner to open and close them in a plurality of different combinations whereby to establish selectively in the said communication a plurality of different liquid pressures corresponding respectively to each of the combinations for a given liquid pressure delivered by the pump, additional means effective independently of the manually operative means to so control the plurality of choke means as to cause one certain liquid pressure to be established in said communication and at the same time to cause the motor device driving the pump to stop, and means controlled according to the liquid pressure in the communication for controlling the degree of application and the release of the brakes on the vehicle and effective in response to the said one certain pressure resulting from the operation of said additional means for effecting application of the brakes to a maximum degree.

12. Vehicle brake apparatus comprising, in combination, dynamic brake means, friction brake means, means providing a communication for containing liquid under pressure, a pump for supplying liquid at a given pressure into said communication and receiving liquid at a reduced pressure from said communication, a plurality of choke means so arranged as to control the relative rates of supply of liquid under pressure into said communication and of return of liquid under pressure from said communication to said pump, means under the control of the operator of the vehicle for selectively controlling said plurality of choke means so as to cause any one of a plurality of different liquid pressures to be established in said communication for a given liquid pressure delivered by the pump and effective at the same time to initiate an application of the dynamic brake means, and means effective as long as the dynamic brake means is effective above a certain degree for so controlling the control means for the choke means as to prevent a variation of the pressure in said communication from a certain normal pressure, and means effective in response to said certain normal liquid pressure in said communication for maintaining the friction brake means on the vehicle released and effective in accordance with the degree of variation from said normal pressure for effecting a corresponding degree of application of the friction brake means.

13. Vehicle brake apparatus comprising, in combination, dynamic brake means for exerting a braking effect on wheels of the vehicle friction brake means for also exerting a braking effect on the vehicle wheels, a hydraulic circulatory system having a certain portion, electroresponsive means for controlling the liquid pressure in said certain portion of the system, manually operative means having a certain position in which the dynamic brake means exerts no braking effect and in which the electroresponsive means is effective to establish a certain pressure in said certain portion of the system, means controlled according to the pressure in said certain portion of the system and responsive to said certain pressure therein for effecting the release of the friction brake means, said manually operative means being operative out of its said certain position to initiate an application of the dynamic brake means and at the same time control the electroresponsive means in a manner to cause a variation of liquid pressure in said certain portion of the system, and means responsive to the braking effect in excess of a certain degree produced by the dynamic brake means for preventing said electroresponsive means from operating in response to the operation of the manually operative means to vary the pressure in said certain portion of the system and effective when the dynamic braking effect produced by the dynamic brake means reduces below said certain degree for restoring the electroresponsive means to the control of the manually operative means, the means responsive to the liquid pressure in said certain portion of the system being effective in response to the variation of the liquid pressure in said certain portion of the system from the normal pressure for effecting an application of the friction brake means.

14. Vehicle brake apparatus comprising, in combination, dynamic brake means for exerting a braking effect on the vehicle wheels, friction brake means for also exerting a braking effect on the vehicle wheels, means providing a communication for containing liquid under pressure, a pump for supplying liquid under pressure to said communication and receiving fluid liquid at a reduced pressure from said communication, choke means controlling the rate of supply of liquid under pressure from said pump to said communication, a plurality of choke means controlling the rate of release of liquid under pressure from said communication to said pump, a plurality of electroresponsive means, one for each of said release choke means respectively, effective when energized to close the corresponding one of said release choke means and when deenergized to cause opening thereof, a manually operative device having a certain position in which it causes the dynamic brake means to be conditioned so as not to exert a braking effect and, simultaneously therewith, effects energization of all of said electroresponsive means, said manually operative device being shiftable out of its certain position in varying degrees to any one of a plurality of different positions in which application of the dynamic brake means is initiated to a degree determined according to the displacement of the manually operative device from its certain position and in which the plurality of electroresponsive means are selectively energized or deenergized in different combinations according to the degree of displacement of the manually operative device from its certain position, the said plurality of choke means being effective according to the particular combination of electroresponsive means energized or deenergized to establish any one of a plurality of different liquid pressures in said communication, means controlled according to the liquid pressure in said communication for controlling the degree of application of the friction brake means and effective in response to the pressure established in the communication upon energization of all of the electroresponsive means to cause release of the friction brake means, and means effective as long as the dynamic brake means produces a braking effect in excess of a certain degree for causing energization of all of the electroresponsive means independently of the manually operative device whereby application of the friction brake means is suppressed and operative when the degree of braking effect produced by the dynamic brake means reduces below said certain degree for restoring the plurality of electroresponsive means to the control of the manually operative device.

15. Vehicle brake apparatus comprising dynamic brake means for exerting a braking effect on the vehicle wheels, friction brake means for also exerting a braking effect on the vehicle wheels, a plurality of electroresponsive devices energizable and deenergizable in a plurality of different combinations to control the degree of application of the friction brake means and the release thereof, a manually operative device having a certain position in which it causes the dynamic brake means to be conditioned so as not to exert a braking effect and in which the plurality of electroresponsive means are so controlled as to effect the release of the friction brakes, said manually operative device being operative to different operating positions at varying degrees of displacement from the certain position for causing application of the dynamic brake means to a corresponding degree and the control of the electroresponsive means to effect application of the friction brake means to a corresponding degree, and means operative as long as the dynamic brake means produces a braking effect in excess of a certain degree for controlling a plurality of electroresponsive means in a manner to maintain the friction brake means released and operative when the dynamic braking effect reduces below the said certain degree to restore the electroresponsive means to the control of the manually operative device whereby the application of the friction brake means is effected to a degree in accordance with the degree of displacement of the manually operative device from its normal position.

16. Vehicle brake apparatus comprising, in combination, dynamic brake means including a dynamic braking circuit in which dynamic braking current flows, friction brake means, a plurality of electroresponsive means adapted to be energized and deenergized in a plurality of different combinations to control the degree of application and the release of the friction brake means, a manually operative device having a certain position in which the dynamic braking circuit is interrupted and the plurality of electroresponsive means so controlled as to cause the release of the friction brake means and operative to a plurality of different positions displaced different degrees out of the certain position to establish the dynamic braking circuit and cause application of the dynamic brake means to a degree corresponding to the degree of displacement of the manually operative device out of its certain position and also effective to control the plurality of electroresponsive means in a manner tending to cause application of the friction brake means to a degree corresponding to the displacement of the manually operative device out of its certain position, and a relay device controlled by the current in the dynamic braking circuit and effective as long as the current exceeds a certain value for controlling the plurality of electroresponsive means in a manner to maintain the friction brake means released.

17. Vehicle brake apparatus comprising, in combination, dynamic brake means including a dynamic braking circuit in which dynamic braking current flows, friction brake means, a plurality of electroresponsive means adapted to be energized and deenergized in a plurality of different combinations to control the degree of application and the release of the friction brake means, a manually operative device having a certain position in which the dynamic braking circuit is interrupted and the plurality of electroresponsive means so controlled as to cause the release of the friction brake means and operative to a plurality of different positions displaced different degrees out of the certain position to establish the dynamic braking circuit and cause application of the dynamic brake means to a degree corresponding to the degree of displacement of the manually operative device out of its certain position and also effective to control the plurality of electroresponsive means in a manner tending to cause application of the friction brake means to a degree corresponding to the displacement of the manually operative device out of its certain position, and a relay having two separate windings each effective to cause operation of the relay when energized by current exceeding certain respective values to so control the plurality of electroresponsive means as to maintain the friction brake means released, one of said windings being energized by a current exceeding the certain value therefor as long as the dynamic braking current exceeds a certain value, and means for independently energizing the other of said windings to a degree in excess of the certain value therefor at any time.

18. Vehicle brake apparatus comprising, in combination, dynamic brake means including a dynamic braking circuit, friction brake means, common control means for establishing the dynamic braking circuit to initiate application of the dynamic brake means and also effective to initiate application of the friction brake means, a relay having two separate windings, said relay being adapted to be picked-up when either of said windings is energized a sufficient amount to prevent the application of the friction brake means, means for causing energization of one of the windings of said relay in accordance with the current in the dynamic braking circuit, and means normally effective to cause deenergization of the other of the windings of said relay and operative at any time to cause energization thereof.

19. Vehicle brake and propulsion apparatus comprising, in combination, electric motors associated with the wheels of the vehicle for driving the vehicle and adapted to operate as dynamic brakes, friction brake means for exerting a braking effect on the wheels of the vehicle, a hydraulic circulatory system including a certain portion, means responsive to the liquid pressure in said certain portion of the system for controlling the degree of application and the release of the friction brake means, and a common controller for controlling the said motors to act either to propel the vehicle or to exert a dynamic braking effect, the common controller being also effective to control the pressure in the said certain portion of the system whereby to control the degree of application and release of the friction brake means.

20. Vehicle brake apparatus comprising, in combination, dynamic brake means for exerting a braking effect on the vehicle wheels, friction brake means for also exerting a braking effect on the vehicle wheels, a plurality of electroresponsive means effective when all are energized to cause the release of the friction brake means and when one or more of the electroresponsive means are energized or deenergized in different combinations to cause selectively different corresponding degrees of application of the friction brake means, a common control means for controlling the dynamic brake means and said plurality of electroresponsive means, and means operative as long as the dynamic brake means exerts a dynamic braking effect in excess of a certain degree for rendering one of said electroresponsive means non-controllable by the said control means, thereby to permit full application of the friction brake means only after the dynamic braking effect has reduced below said certain degree.

21. Vehicle brake apparatus comprising, in combination, dynamic brake means for exerting a braking effect on wheels of the vehicle, friction brake means for also exerting a braking effect on wheels of the vehicle, a plurality of electroresponsive means effective when energized or deenergized in a plurality of different combinations to correspondingly control the release and the degree of application of the friction brake means, a common controller for controlling said dynamic brake means and said plurality of electroresponsive means to simultaneously initiate an application of the dynamic brake means and the friction brake means, means effective as long as the dynamic brake means produces a braking effect in excess of a certain degree for so controlling the plurality of electroresponsive means as to prevent application of the friction brake means, and means under the control of the operator of the vehicle for rendering the last said means non-effective whereby, upon operation of the said common controller to initiate application of the brakes, the dynamic brake means and the friction brake means are simultaneously applied.

22. Vehicle brake apparatus comprising, in combination, dynamic brake means including a dynamic braking circuit, friction brake means, a plurality of electroresponsive means energizable and deenergizable in a plurality of different combinations to correspondingly control the release or the degree of application of the friction brake means, a common controller having a certain position, in which the dynamic braking circuit is interrupted and the plurality of electroresponsive means are so controlled as to effect the release of the friction brake means, and operative out of its certain position to establish the dynamic braking circuit and so control the plurality of electroresponsive means as to initiate an application of the friction brake means, a relay having a winding energized in accordance with the degree of current in the dynamic braking circuit and effective as long as the current exceeds a certain value for so controlling the plurality of electroresponsive means as to maintain the friction brake means released, and means under the control of the operator of the vehicle for preventing energization of the winding of the said relay whereby when the said controller is operated to initiate application of the brakes, the dynamic brake means and the friction brake means are simultaneously applied.

23. Vehicle brake apparatus comprising, in combination, dynamic brake means adapted to exert a braking effect on wheels of the vehicle, friction brake means adapted also to exert a braking effect on wheels of the vehicle, a common controller having a certain position in which the dynamic brake means and the friction brake means are released and operative out of said certain position to simultaneously initiate application of the dynamic brake means and of the friction brake means, means controlled according to the degree of dynamic braking effect and effective as long as it exceeds a certain degree for preventing application of the friction brake means, and means responsive to a variable operating condition of the vehicle for rendering the last said means ineffective to prevent application of the friction brake means even though the dynamic braking effect exceeds said certain degree.

24. Vehicle brake apparatus comprising, in combination, dynamic brake means adapted to exert a braking effect on wheels of the vehicle, friction brake means adapted also to exert a braking effect on wheels of the vehicle, a common controller having a certain position in which the dynamic brake means and the friction brake means are released and operative out of said certain position to simultaneously initiate application of the dynamic brake means and of the friction brake means, means controlled according to the degree of dynamic braking effect and effective as long as it exceeds a certain degree for preventing application of the friction brake means, and means responsive to the load carried by the vehicle for rendering the last said means effective to prevent application of the friction brake means in response to dynamic braking effect exceeding the said certain degree only if the load carried by the vehicle is less than a certain degree.

25. Vehicle brake apparatus comprising, in combination, dynamic brake means adapted to exert a braking effect on wheels of the vehicle, friction brake means adapted also to exert a braking effect on wheels of the vehicle, a common controller having a certain position in which the dynamic brake means and the friction brake means are released and operative out of said certain position to simultaneously initiate application of the dynamic brake means and of the friction brake means, means controlled according to the degree of dynamic braking effect and effective as long as it exceeds a certain degree for preventing application of the friction brake means, inertia means carried on the vehicle and responsive according to the rate of retardation of the vehicle and thereby reflecting variations in the load carried by the vehicle for rendering said last means effective to maintain the friction brake means released under the control of the dynamic braking effect only as long as the rate of retardation of the vehicle exceeds a certain rate.

26. Vehicle brake apparatus comprising, in combination, dynamic brake means adapted to exert a braking effect on wheels of the vehicle, friction brake means adapted also to exert a braking effect on wheels of the vehicle, a common controller having a certain position in which the dynamic brake means and the friction brake means are released and operative out of said certain position to simultaneously initiate application of the dynamic brake means and of the friction brake means, means controlled according to the degree of dynamic braking effect and effective as long as it exceeds a certain degree for preventing application of the friction brake means, inertia means carried on the vehicle and displaceable out of a certain position thereof in proportion to the rate of retardation of the vehicle, and means effective only so long as the displacement of the inertia element out of its certain position exceeds a certain amount for rendering the said preventing means effective to prevent application of the friction brake means under the control of the dynamic braking effect.

27. Brake apparatus for a multiple-unit vehicle, said apparatus comprising dynamic brake means for each of a plurality of the units of the vehicle for exerting a braking effect on the wheels of the corresponding unit, friction brake means for each of a plurality of the units of the vehicle for also exerting a braking effect on the wheels of the corresponding unit, a single controller on one of the units for controlling the dynamic brake means and the friction brake means on the units so equipped so as to simultaneously initiate application of the dynamic brake means and friction brake means, suppression means on each of the units having dynamic brake means and friction brake means for preventing application of the friction brake means as long as the dynamic braking effect produced by the dynamic brake means exceeds a certain degree, and means on one unit for rendering the said suppression means on the units so equipped effective or not effective to prevent application of the friction brake means on the corresponding units under the control of the dynamic braking effect.

28. Brake apparatus for a multiple-unit vehicle, said apparatus comprising dynamic brake means for each of a plurality of the units of the vehicle for exerting a braking effect on the wheels of the corresponding unit, friction brake means for each of a plurality of the units of the vehicle for also exerting a braking effect on the wheels of the corresponding unit, a single controller on one of the units for controlling the dynamic brake means and the friction brake means on the units so equipped so as to simultaneously initiate application of the dynamic brake means and friction brake means, suppression means on each of the units having dynamic brake means and friction brake means for preventing application of the friction brake means as long as the dynamic braking effect produced by the dynamic brake means exceeds a certain degree, inertia means carried on one unit of the vehicle and displaceable out of a certain position thereof proportionally to the rate of retardation of the vehicle, and means controlled by said inertia means and effective only when the displacement of the inertia means out of its certain position exceeds a certain amount for rendering the suppression means effective to prevent the application of the friction brake means under the control of the dynamic braking effect.

29. Brake apparatus for a vehicle of the type having at least one wheel truck provided with sprung and unsprung portions adapted to have different relative positions depending upon the load carried by the vehicle, said apparatus comprising dynamic brake means for exerting a braking effect on the wheels of the vehicle, friction brake means for also exerting a braking effect on the wheels of the vehicle, a single controller for simultaneously initiating application of the dynamic brake means and of the friction brake means, suppression means controlled according to the degree of dynamic braking effect produced by the dynamic brake means and effective as long as the dynamic braking effect exceeds a certain value for preventing application of the friction brake means, and means controlled according to the relative positions of the sprung and unsprung portions of the wheel truck of the vehicle for rendering said suppression means effective or non-effective to prevent application of the friction brake means.

30. Brake apparatus for a vehicle of the type having at least one wheel truck provided with sprung and unsprung portions adapted to have different relative positions depending upon the load carried by the vehicle, said apparatus comprising dynamic brake means for exerting a braking effect on the wheels of the vehicle, friction brake means for also exerting a braking effect on the wheels of the vehicle, a single controller for simultaneously initiating application of the dynamic brake means and of the friction brake means, suppression means controlled according to the degree of dynamic braking effect produced by the dynamic brake means and effective as long as the dynamic braking effect exceeds a certain value for preventing application of the friction brake means, and means controlled according to the relative positions of the sprung and unsprung portions of the wheel truck of the vehicle for rendering the suppression means effective to prevent application of the friction brake means under the control of the dynamic braking effect only if the sprung and unsprung portions of the wheel truck do not approach within a certain uniform distance of each other.

31. Brake apparatus for a wheeled vehicle comprising, in combination, dynamic brake means for exerting a braking effect on the wheels of the vehicle, friction brake means also effective to exert a braking effect on the wheels of the vehicle, a single controller for controlling the dynamic brake means and the friction brake means and operative to simultaneously initiate application of the dynamic brake means and the friction brake means, and means responsive according to the degree of the dynamic braking effect produced by the dynamic braking means and effective to prevent application of the friction brake means as long as the dynamic braking effect exceeds a certain degree and then operative upon the reduction of the dynamic braking effect with reducing speed in the normal manner for causing application of the friction brake means to a certain low degree, said last means being also effective if the dynamic brake means fails to exert dynamic braking effect when it should do so for causing application of the friction brake means instantly under the control of said single controller.

32. Brake apparatus for a wheeled vehicle comprising dynamic brake means for exerting a braking effect on wheels of the vehicle, friction brake means for also exerting a braking effect on wheels of the vehicle, a single controller having a certain position in which both the dynamic brake means and the friction brake means are released and operative out of the certain position varying degrees to initiate a corresponding degree of application of the dynamic brake means and of the friction brake means, and suppression means effective as long as the dynamic braking effect produced by the dynamic brake means exceeds a certain degree for preventing application of the friction means and operative upon the reduction of the dynamic braking effect in normal manner with reducing speed below said certain degree for causing application of the friction brake means to a certain uniform low degree, said suppression means being effective if the dynamic brake means fails at any time to produce braking effect when it should do so for causing application of the friction brake means in varying degrees according to the displacement of said controller out of its certain position.

33. Brake apparatus for a wheeled vehicle comprising, in combination, dynamic brake means for exerting a braking effect on wheels of the vehicle, friction brake means also effective to exert a braking effect on wheels of the vehicle, a plurality of electroresponsive means effective when all of said electroresponsive means are energized for effecting release of the friction brake means and when one or more or all of said electroresponsive means are deenergized in different combinations to cause application of the friction brake means selectively to corresponding different degrees, a single controller having a certain position in which it causes said dynamic brake means to be conditioned not to exert a dynamic braking effect and in which it causes all of said electroresponsive means to be energized to cause release of the friction brake means, said controller being operative out of its said certain position to any one of a plurality of different positions variously spaced from its certain position to initiate application of the dynamic brake means in accordance with the degree of displacement of the controller out of its certain position and deenergization of one or more or all of the electroresponsive means in accordance with the degree of displacement of the controller out of its certain position, and suppression means effective as long as the dynamic braking effect produced by the dynamic brake means exceeds a certain degree for maintaining all of the electroresponsive means energized and operative when the dynamic braking effect reduces below the said certain degree in normal manner with reducing vehicle speed for effecting deenergization of only one of said electroresponsive means independently of the degree of displacement of the controller out of its certain position, said suppression means being also operative if the dynamic brake means fails at any time to produce the dynamic braking effect in normal manner for causing deenergization of one or more or all of the electroresponsive means in accordance with the degree of displacement of the controller out of its certain position.

34. Brake apparatus for a wheeled vehicle comprising, in combination, dynamic brake means for exerting a braking effect on wheels of the vehicle, friction brake means also effective to exert a braking effect on wheels of the vehicle, a plurality of electroresponsive means effective when all of said electroresponsive means are energized for effecting release of the friction brake means and when one or more/or all of said electroresponsive means are deenergized in different combinations to selectively cause application of the friction brake means selectively to corresponding different degrees, a single controller having a certain position in which it causes said dynamic brake means to be conditioned not to exert a dynamic braking effect and in which it causes all of said electroresponsive means to be energized to cause release of the friction brake means, said controller being operative out of its said certain position to any one of a plurality of different positions variously spaced from its certain position to initiate application of the dynamic brake means in accordance with the degree of displacement of the controller out of its certain position and deenergization of one or more or all of the electroresponsive means in accordance with the degree of displacement of the controller out of its certain position, suppression means effective as long as the dynamic braking effect produced by the dynamic brake means exceeds a certain degree for maintaining all of the electroresponsive means energized and operative when the dynamic braking effect reduces below the said certain degree in normal manner with reducing vehicle speed for effecting deenergization of only one of said electroresponsive means independently of the degree of displacement of the controller out of its certain position, said suppression means being also operative if the dynamic brake means fails at any time to produce the dynamic braking effect in normal manner for causing deenergization of one or more or all of the electroresponsive means in accordance with the degree of displacement of the controller out of its certain position, and additional means effective independently of the said controller for simultaneously initiating application of the dynamic brake means and deenergizing all of the electroresponsive means, said last means being effective to prevent energization of any of the electroresponsive means by said suppression means notwithstanding the fact that the dynamic brake means may produce dynamic braking effect in excess of said certain degree.

35. Brake apparatus for a wheeled vehicle comprising, in combination, dynamic brake means including a dynamic braking circuit for causing a braking effect to be exerted on the vehicle wheels, friction brake means also effective to exert a braking effect on the vehicle wheels, a plurality of electroresponsive means effective when all are energized simultaneously to cause the friction brake means to be released and adapted when one or more or all are selectively deenergized in different combinations to cause application of the friction brake means to any one of a plurality of different degrees, a single controller having a certain position in which the dynamic braking circuit is interrupted and all of the electroresponsive means are energized and operative different degrees out of its certain position to a plurality of different operating positions to cause establishment of the dynamic brake circuit and deenergization of one or more or all of the electroresponsive means, a relay having a winding energized according to the current in the dynamic braking circuit and effective as long as the current in the dynamic braking circuit exceeds a certain value for causing energization of all of the electroresponsive means independently of the said controller thereby to suppress application of the friction brake means, and a second relay having two windings, one of which is energized in accordance with the current in the dynamic braking circuit and the other of which is energized under the control of the first said relay when effective to cause energization of the electroresponsive means, said two windings of the said second relay exerting opposing effects whereby said relay is operated to its picked-up position just prior to the reduction in the dynamic braking current below said certain degree if the dynamic braking current reduces in normal manner with reducing vehicle speed, said second relay having a self-holding contact adapted to establish a self-holding circuit for energizing the said other winding of said second relay to maintain said second relay picked-up after the said first relay drops-out, said second relay being effective in its picked-up position to effect deenergization of one certain one of the electroresponsive means and energization of the other electroresponsive means independently of the position of the said controller, and means effective upon the return of the said controller to its said certain position for interrupting the holding circuit for the other winding of said second relay to cause the return of the relay to its dropped-out position.

36. Brake apparatus for wheeled vehicle comprising, in combination, dynamic brake means including a dynamic braking circuit for causing a braking effect to be exerted on the vehicle wheels, friction brake means also effective to exert a braking effect on the vehicle wheels, a plurality of electroresponsive means effective when all are energized simultaneously to cause the friction brake means to be released and adapted when one or more or all are selectively deenergized in different combinations to cause application of the friction brake means to any one of a plurality of different degrees, a single controller having a certain position in which the dynamic braking circuit is interrupted and all of the electroresponsive means are energized and operative different degrees out of its certain position to a plurality of different operating positions to cause establishment of the dynamic brake circuit and deenergization of one or more or all of the electroresponsive means, a relay having a winding energized according to the current in the dynamic braking circuit and effective as long as the current in the dynamic braking circuit exceeds a certain value for causing energization of all of the electroresponsive means independently of the said controller thereby to suppress application of the friction brake means, and a second relay having two windings, one of which is energized in accordance with the current in the dynamic braking circuit and the other of which is energized under the control of the first said relay when effective to cause energization of the electroresponsive means, said two windings of the said second relay exerting opposing effects whereby said relay is operated to its picked-up position just prior to the reduction in the dynamic braking current below said certain degree if the dynamic braking current reduces in normal manner with reducing vehicle speed, said second relay having a self-holding contact adapted to establish a self-holding circuit for energizing the said other winding of said second relay to maintain said second relay picked-up after the said first relay drops-out, said second relay being effective in its picked-up position to effect deenergization of one certain one of the electroresponsive means and energization of the other electroresponsive means independently of the position of the said controller, means effective upon the return of the said controller to its said certain position for interrupting the holding circuit for the other winding of said second relay to cause the return of the relay to its dropped-out position, said first and said second relay remaining in their dropped-out positions or being restored to their dropped-out positions in the event that the dynamic braking current fails in abnormal manner, thereby causing said electroresponsive means to remain under the control of the said single controller.

37. Brake apparatus for a wheeled vehicle comprising, in combination, dynamic brake means for exerting a braking effect on the wheels of the vehicle, friction brake means for also exerting a braking effect on the wheels of the vehicle, a single controller having a certain position in which both the dynamic brake means and the friction brake means are released and operative out of its certain position into any one of a plurality of service application positions for simultaneously initiating application of the dynamic brake means and application of the friction brake means in varying degrees according to the service application position to which it is shifted, said controller being operative also to an emergency application position to initiate application of the dynamic brake means and of the friction brake means to a maximum degree respectively, suppression means controlled according to the degree of dynamic braking effect produced by the dynamic braking means, and means controlled according to the operative positive of the said controller and operative when the controller is shifted to a service application position for rendering said suppression means effective to completely suppress the application of the friction brake means as long as the dynamic braking effect exceeds a certain value and operative when the controller is in the emergency application position thereof to render said suppression means effective to only partly suppress the application of the friction brake means during the time that the dynamic braking effect exceeds a certain degree.

38. Brake apparatus for a wheeled vehicle comprising, in combination, dynamic brake means for exerting a braking effect on the wheels of the vehicle, friction brake means for also exerting a braking effect on the wheels of the vehicle, a single controller having a certain position in which both the dynamic brake means and the friction brake means are released and operative out of its certain position into any one of a plurality of service application positions for simultaneously initiating application of the dynamic brake means and application of the friction brake means in varying degrees according to the service application position to which it is shifted, said controller being operative also to an emergency application position to initiate application of the dynamic brake means and of the friction brake means to a maximum degree respectively, suppression means controlled according to the degree of dynamic braking effect produced by the dynamic braking means, and means controlled according to the operative position of the said controller and operative when the controller is shifted to a service application position for rendering said suppression means effective to completely suppress the application of the friction brake means as long as the dynamic braking effect exceeds a certain value and operative when the controller is in the emergency application position thereof to render said suppression means effective to only partly suppress the application of the friction brake means during the time that the dynamic braking effect exceeds a certain degree, said suppression means being effective when the dynamic braking effect reduces below said certain degree while the controller is in a service application position for causing application of the friction brake means to a degree determined according to the position of the controller and effective when the dynamic braking effect reduces below said certain degree while the controller is in its emergency application position for causing application of the friction brake means to a maximum degree.

39. Brake apparatus for a wheeled vehicle comprising, in combination, dynamic brake means for exerting a braking effect on wheels of the vehicle, friction brake means for also exerting a braking effect on wheels of the vehicle, a plurality of electroresponsive means cooperating in such manner that when all of the electroresponsive means are energized the friction brake means is released and effective upon deenergization of one or more or all thereof for effecting application of the friction brake means in varying degrees respectively, the maximum degree of application of the friction brake means occurring when all of said electroresponsive means are deenergized, a single controller having a certain position in which the dynamic brake means is released and in which it effects energization of all of said electroresponsive means whereby the friction brake means is released, said controller being operative to any one of a plurality of service application positions for deenergizing one or more but less than all of said electro-responsive means and at the same time initiating an application of the dynamic brake means, and operative to an emergency application position in which it effects deenergization of all of the electroresponsive means and application of the dynamic brake means to a maximum degree, suppression means controlled according to the degree of dynamic braking effect, and additional means operative to one position when the controller is in a service application position and operative to a different position when the controller is in its emergency application position, said suppression means being effective as long as the dynamic braking effect exceeds a certain degree at any time to cause energization of one of said electroresponsive means, and said suppression means and additional means being jointly effective when the controller is in a service application position to cause energization of the other electroresponsive means as long as the dynamic braking effect exceeds a certain degree and non-effective to cause energization of said other electroresponsive means even while the dynamic braking effect exceeds said certain degree if the said controller is in its emergency application position.

40. Brake apparatus for a wheeled vehicle comprising, in combination, dynamic brake means for exerting a braking effect on wheels of the vehicle, friction brake means adapted to also exert a braking effect on wheels of the vehicle, a single controller having a certain position in which the dynamic brake means and the friction brake means are both released, operative to any one of a plurality of service application positions to initiate application of the dynamic brake means and friction brake means in varying degree according to the service application position of the controller, and operative to an emergency application position to initiate application of the dynamic brake means, and of the friction brake means to maximum degrees respectively, means controlled according to the degree of dynamic braking effect produced by the dynamic brake means, means controlled according to whether the controller is in a service application or its emergency application position, said last two means being jointly effective if the controller is in a service application position for causing complete suppression of the friction brake means as long as the dynamic braking effect exceeds a certain value and, when the dynamic braking effect reduces below said certain degree, for causing application of the friction brake means to a degree corresponding to the service application position of the controller, and operative while the controller is in its emergency application position for causing only partial suppression of application of the friction brake means as long as the dynamic braking effect exceeds said certain degree and effective when the dynamic braking effect reduces below said certain degree for causing application of the friction brake means to a maximum degree.

41. Brake apparatus for a wheeled vehicle comprising, in combination, dynamic brake means for exerting a braking effect on wheels of the vehicle, friction brake means adapted also to exert a braking effect on wheels of the vehicle, a single controller having a certain position in which the dynamic brake means and the friction brake means are both released and operative out of its said certain position to any one of a plurality of different braking positions for simultaneously initiating application of the dynamic brake means and the friction brake means, suppression means controlled according to the degree of the dynamic braking effect and adapted when the controller is in certain of its braking positions for completely suppressing the application of the friction brake means as long as the dynamic braking effect exceeds a certain degree and effective when the controller is in one certain one of its braking positions for only partially suppressing the application of the friction brake means as long as the dynamic braking effect exceeds said certain degree.

42. Brake apparatus for a wheeled vehicle comprising, in combination, dynamic brake means adapted to exert a braking effect on the wheels of the vehicle, friction brake means adapted to exert a braking effect on wheels of the vehicle, a single controller having a certain position in which both the dynamic brake means and the friction brake means are released and operative out of said certain position to a plurality of different service application positions and to an emergency application position to simultaneously initiate application of the dynamic brake means and the friction brake means, suppression means effective while the said controller is in a service application position for preventing application of the friction brake means as long as the dynamic braking effect produced by the dynamic brake means exceeds a certain degree and effective when the dynamic braking effect reduces below said certain degree to cause application of the friction brake means to one certain relatively low degree, said suppression means being effective while the said controller is in a service application position in the event that the dynamic brake means fails at any time to produce dynamic braking effect when it should do so, to cause application of the friction brake means to any one of a plurality of different degrees depending upon the position of the controller, and means controlled according to the position of the controller and effective while the controller is in its emergency application position for causing said suppression means to be effective as long as the dynamic braking effect produced by the dynamic brake means exceeds said certain degree to only partially suppress the application of the friction brake means and when the dynamic braking effect reduces in normal manner with reducing vehicle speed below said certain degree to cause application of the friction brake means to a maximum degree, said suppression means being effective in the event of the failure of the dynamic brake means at any time to produce dynamic braking effect, while the controller is in its emergency application position, to cause application of the friction brake means instantly to a maximum degree.

43. Brake apparatus comprising a pump for supplying fluid, a discharge passage through which fluid supplied by said pump flows, means providing a communication, means for controlling the rate of supply of fluid from said passage into said communication, means for controlling the rate of venting of fluid from said communication, said supply-rate control means and venting-rate control means cooperating in a manner to selectively establish in said communication any one of a plurality of different fluid pressures for any given fluid pressure in said discharge passage, and means responsive to variations of pressure in said communication for controlling the degree of application and the release of the brakes.

44. Brake apparatus comprising a pump for supplying fluid, a discharge passage through which fluid supplied by said pump flows, means for maintaining a substantially constant pressure in said discharge passage, means providing a communication, means for controlling the rate of supply of fluid from said discharge passage into said communication, means for controlling the rate of venting of fluid from said communication, said supply-rate control means and said venting-rate control means cooperating in a manner to establish selectively in said communication any one of a plurality of certain different fluid pressures while a given fluid pressure is maintained in said discharge passage, and means responsive to variations of pressure in said communication for controlling the degree of application and the release of the brakes.

45. Brake apparatus comprising a pump for supplying liquid, a discharge passage through which liquid supplied by the pump flows, means providing a communication, a first means for controlling the rate of supply of liquid from said discharge passage into said communication, a second means for controlling the rate of venting of liquid from said communication, means under the control of an operator for controlling said first means to vary the rate of supply of liquid into said communication whereby to selectively establish in said communication a plurality of different liquid pressures for any given liquid pressure in said discharge passage, and means responsive to variations of pressure in said communication for controlling the degree of application and the release of the brakes.

46. Brake apparatus comprising a pump for supplying liquid, a discharge passage for receiving liquid supplied by said pump, means providing a communication, a choke element interposed between said discharge passage and said communication for controlling the rate of supply of liquid from said passage into said communication, a plurality of choke elements of different relative sizes effective individually and collectively in different combinations to release liquid from said communication at different rates whereby to establish selectively a plurality of different liquid pressures in said communication for any given liquid pressure in said passage, and means responsive to the pressure in said communication for controlling the degree of application and the release of the brakes.

47. Hydraulic brake apparatus comprising means providing a communication, a first choke element and a second choke element arranged in serial relation in said communication between the ends thereof, means for supplying liquid at a substantially constant pressure into one end of the communication adjacent the said first choke element, manually controlled means effective to open or close communication through said second choke element, said first and said second choke elements cooperating in such a manner that when communication through said second choke element is closed a pressure corresponding to the supply pressure is established in the portion of said communication between said choke elements and when communication through said second choke element is opened a pressure having a certain uniform relation to the supply pressure is established in the portion of the communication between said choke elements, and means controlled in accordance with the pressure in the portion of said communication between said choke elements for controlling the degree of application and the release of the brakes.

48. Hydraulic brake apparatus comprising a pump for supplying liquid, means providing a communication into which fluid supplied by the pump is received and through which the fluid flows back to said pump in a circulatory manner, a first choke element and a second choke element arranged in serial relation in said communication, means for opening and closing communication through said second choke element, said first and said second choke elements cooperating in such a manner that when communication through the second choke element is closed a pressure is established in that portion of the communication between the choke elements equal to that supplied into the communication and when communication through the second choke element is opened a pressure is established in the portion of the communication between the choke elements having a certain fixed relation to the pressure of the liquid supplied into the communication, means controlled according to the pressure in the portion of the communication between said choke elements for controlling the degree of application and the release of the brakes, and means effective whether communication through said second choke element is opened or closed for maintaining a certain uniform pressure of the liquid supplied into said communication.

49. Brake apparatus comprising means providing a communication, a pump for discharging liquid into one end of said communication and receiving liquid from the other end at a reduced pressure, means for causing the pressure of the liquid received in said communication from said pump to be maintained at a substantially constant pressure, a first choke element in said communication subject on one side to the pressure of the liquid supplied from the pump, a plurality of parallel-related choke elements in said communication arranged in serial relation with the said first choke element and subject on one side to the reduced pressure in the communication, means for selectively opening and closing communication through one or more or all of said plurality of choke elements, said first choke element and said plurality of choke elements cooperating in such a manner as to establish any one of a plurality of different liquid pressures in the intermediate portion of the communication between the first choke element and the plurality of choke elements depending upon the combination of the plurality of choke elements effective to release fluid under pressure from the intermediate portion of the communication, and means controlled in accordance with the pressure established in the intermediate portion of the communication for controlling the degree of application and the release of the brakes.

50. Brake apparatus comprising means providing a communication, a pump for discharging liquid into one end of said communication and receiving liquid from the other end at a reduced pressure, means for causing the pressure of the liquid supplied into said communication from said pump to be maintained at a substantially constant pressure, a first choke element in said communication subject on one side to the pressure of the liquid supplied by the pump, a plurality of parallel-related choke elements in said communication in serial relation with said first choke element and subject on one side to the reduced pressure in the communication, a plurality of electroresponsive valve means each of which is effective to control communication through a corresponding one of said parallel-related choke elements, means for energizing and deenergizing said electroresponsive valve means selectively in different combinations whereby to cause communication through any one of said parallel-related choke elements or any combination of said parallel-related choke elements to be opened or closed, said first choke element and said plurality of parallel-related choke elements cooperating in such a manner as to establish any one of a plurality of different liquid pressures in the intermediate portion of the communication between the first choke element and the plurality of parallel-related choke elements depending upon the combination of the parallel-related choke elements through which communication is open, and means controlled in accordance with the pressure established in the intermediate portion of the communication for controlling the degree of application and the release of the brakes.

51 In a hydraulic brake system for a multiple-unit vehicle, the combination of a pump on one or each of more than one of the units for supplying liquid, means providing a communication on each of the units having a pump for receiving liquid from the pump at one end and returning the liquid to the pump at a reduced pressure at the opposite end, means for causing the pressure of the liquid discharged from the pump into the communication to be maintained substantially constant, a first choke element in said communication for controlling the rate at which liquid is supplied to a succeeding portion of said communication, means for varying the rate at which liquid is supplied from said portion of the communication to the pump, means on one of said units for controlling each of the last said means in unison whereby to establish selectively in the said portion of the communication on each unit provided therewith any one of a plurality of different liquid pressures having certain fixed relation to the constant fluid pressure supplied, and means on one or each of more than one of said units responsive to the liquid pressure in the said portion of the communication on the corresponding unit for controlling the degree of application and release of the brakes on the corresponding unit.

52. In a hydraulic brake system for a multiple-unit vehicle, the combination of means providing a communication on one or each of more than one of the units on the vehicle, means including a pump for causing liquid at a substantially constant pressure to be supplied into said communication, a plurality of choke means so arranged as to control the rate of supply of liquid at said constant pressure into a portion of said communication and the rate of release of liquid from said portion of the communication on each unit so equipped, said choke means cooperating in a manner to cause any one of a plurality of different liquid pressures to be established in the said portion of the communication, a plurality of train wires extending from unit to unit throughout the train, means on one of said units for selectively energizing and deenergizing said train wires in a plurality of different combinations, a plurality of electroresponsive means respectively controlled according to energization and deenergization of a corresponding one of said train wires for opening and closing certain of said choke means of each unit so equipped whereby to establish selectively and in unison the same liquid pressure in the said portion of the communication of each unit so equipped, and means on each of the units having a communication responsive to the liquid pressure in the said portion of the communication for controlling the degree of application and the release of the brakes on the corresponding unit.

53. In a brake control apparatus for a vehicle having brakes the degree of application and the release of which are controlled in response to th variation of fluid pressure acting on a movable abutment, the combination of a hydraulic circulatory system including two serially-related choke means, said two choke means cooperating in accordance with the relative flow capacities thereof to effect variations in the pressure in that portion of the system between said two choke means, the pressure in that portion of the system between said two choke means being active on said abutment, and means under the control of the operator of the vehicle for varying the flow capacity of one of said choke means with respect to the flow capacity of the other of said choke means whereby to effect variations of the pressure in the portion of the system between said two choke means.

54. In a brake control apparatus for a vehicle having brakes the degree of application and the release of which are controlled in response to the variation of fluid pressure acting on a movable abutment, the combination of a hydraulic circulatory system including two serially-related choke means, said two choke means cooperating in accordance with the relative flow capacities thereof to effect variations in the pressure in that portion of the system between said two choke means, the pressure in that portion of the system between said two choke means being active on said abutment, means under the control of the operator of the vehicle for varying the flow capacity of one of said choke means with respect to the flow capacity of the other of said choke means whereby to effect variations of the pressure in the portion of the system between said two choke means, and additional means operative to so control the flow capacity of said one choke means as to cause such a pressure to be established in that portion of the system between said two choke means as will produce a release of the brakes.

55. In a brake control apparatus for a vehicle having brakes the degree of application and the release of which are controlled in response to the variation of fluid pressure acting on a movable abutment, the combination of a hydraulic circulatory system including two serially-related choke means, said two choke means cooperating in accordance with the relative flow capacities thereof to effect variations in the pressure in that portion of the system between said two choke means, the pressure in that portion of the system between said two choke means being active on said abutment, means under the control of the operator of the vehicle for varying the flow capacity of one of said choke means with respect to the flow capacity of the other of said choke means whereby to effect variations of the pressure in the portion of the system between said two choke means, and additional means effective upon operation to first render said operator controlled means non-effective to control the flow capacity of said one choke means and to then so control the flow capacity of said one choke means as to cause a pressure to be established in that portion of the system between said two choke means as will produce a release of the brakes.

56. In a brake control apparatus for a vehicle having brakes which are applied to different degrees and released in accordance with variation in fluid pressure acting on a movable abutment, the combination of a hydraulic circulatory system including two serially-related choke means, said two choke means cooperating in accordance with the relative flow capacities thereof to control the pressure in that portion of the system between said two choke means, electroresponsive valve means for controlling the flow capacity of one of said choke means, and means under the control of the operator of the vehicle for controlling said electroresponsive valve means whereby to effect variation in the flow capacity of said one choke means and a consequent variation of the pressure in that portion of the system between said two choke means, the pressure in the portion of the system between said two choke means being active on said abutment.

57. In a brake control apparatus for a vehicle having brakes which are applied to different degrees and released in accordance with variation in fluid pressure acting on a movable abutment, the combination of a hydraulic circulatory system including two serially-related choke means, said two choke means cooperating in accordance with the relative flow capacities thereof to control the pressure in that portion of the system between said two choke means, electroresponsive valve means for controlling the flow capacity of one of said choke means, means under the control of the operator of the vehicle for controlling said electroresponsive valve means whereby to effect variation in the flow capacity of said one choke means and a consequent variation of the pressure in that portion of the system between said two choke means, the pressure in the portion of the system between said two choke means being active on said abutment, and a device effective in its normal position to render said operator controlled means effective to control the electroresponsive means and operative out of its normal position to render the operator controlled means non-effective to control the electroresponsive means and also to so control the electroresponsive means as to cause the said one choke means to be of a flow capacity such that the pressure established in that portion of the system between said two choke means is effective to cause the release of the brakes.

EARLE S. COOK.
DOUGLAS R. BORST.

CERTIFICATE OF CORRECTION.

Patent No. 2,317,132.  April 20, 1943.

EARLE S. COOK, ET AL.

It is hereby certified that error appears in the printed specification of the above numbered patent requiring correction as follows: Page 19, first column, line 13, claim 8, for "operated" read --operative--; page 25, first column, line 30, claim 37, for "positive" read --position--; and that the said Letters Patent should be read with this correction therein that the same may conform to the record of the case in the Patent Office.

Signed and sealed this 16th day of May, A. D. 1944.

Leslie Frazer
Acting Commissioner of Patents.

(Seal)

trolled means effective to control the electroresponsive means and operative out of its normal position to render the operator controlled means non-effective to control the electroresponsive means and also to so control the electroresponsive means as to cause the said one choke means to be of a flow capacity such that the pressure established in that portion of the system between said two choke means is effective to cause the release of the brakes.

EARLE S. COOK.
DOUGLAS R. BORST.

CERTIFICATE OF CORRECTION.

Patent No. 2,317,132.   April 20, 1943.

EARLE S. COOK, ET AL.

It is hereby certified that error appears in the printed specification of the above numbered patent requiring correction as follows: Page 19, first column, line 13, claim 8, for "operated" read --operative--; page 25, first column, line 30, claim 37, for "positive" read --position--; and that the said Letters Patent should be read with this correction therein that the same may conform to the record of the case in the Patent Office.

Signed and sealed this 16th day of May, A. D. 1944.

Leslie Frazer

Acting Commissioner of Patents.

(Seal)

CERTIFICATE OF CORRECTION.

Patent No. 2,317,132. April 20, 1943.

EARLE S. COOK, ET AL.

It is hereby certified that error appears in the printed specification of the above numbered patent requiring correction as follows: Page 19, first column, line 13, claim 8, for "operated" read --operative--; page 25, first column, line 30, claim 37, for "positive" read --position--; and that the said Letters Patent should be read with this correction therein that the same may conform to the record of the case in the Patent Office.

Signed and sealed this 16th day of May, A. D. 1944.

Leslie Frazer (Seal) Acting Commissioner of Patents.